US012679503B2

(12) United States Patent (10) Patent No.: US 12,679,503 B2
Vigen et al. (45) Date of Patent: Jul. 14, 2026

(54) SNOW VEHICLE HEAT EXCHANGER SHIELD

(71) Applicant: Arctic Cat Inc., Thief River Falls, MN (US)

(72) Inventors: David Larry Vigen, Thief River Falls, MN (US); Benjamin Nickolas Mercure, Thief River Falls, MN (US); Ken R. Fredrickson, Thief River Falls, MN (US)

(73) Assignee: Arctic Cat Inc., Thief River Falls, MN (US)

(*) Notice: Subject to any disclaimer, the term of this patent is extended or adjusted under 35 U.S.C. 154(b) by 769 days.

(21) Appl. No.: 17/979,091

(22) Filed: Nov. 2, 2022

(65) Prior Publication Data

US 2023/0257064 A1 Aug. 17, 2023

Related U.S. Application Data

(60) Provisional application No. 63/402,768, filed on Aug. 31, 2022, provisional application No. 63/400,056, (Continued)

(51) Int. Cl.
*B62K 25/30* (2006.01)
*B62J 6/04* (2020.01)
(Continued)

(52) U.S. Cl.
CPC ............... *B62M 27/02* (2013.01); *B62J 6/04* (2013.01); *B62J 15/04* (2013.01); *B62M 2027/028* (2013.01)

(58) Field of Classification Search
CPC ............ B62M 2027/028; B62M 27/02; B62M 2027/027; B62D 55/07; B62D 55/32; B62K 19/18
(Continued)

(56) References Cited

U.S. PATENT DOCUMENTS 745,862 A 12/1903 Kerr
2,987,534 A 6/1961 Hymin et al.
(Continued)

FOREIGN PATENT DOCUMENTS

BR 112020005350 B1 5/2023
CA 2456088 A1 8/2001
(Continued)

OTHER PUBLICATIONS

"Yamaha SX Viper Mountain—SXV70MH Bumper Diagram" https://www.partzilla.com/catalog/yamaha/snowmobile/2003/sx-viper-mountain-sxv70mh/bumper (Accessed: Apr. 22, 2022).
(Continued)

*Primary Examiner* — Vivek D Koppikar
*Assistant Examiner* — Nabin Kumar Sharma
(74) *Attorney, Agent, or Firm* — Billion & Armitage

(57) ABSTRACT

A heat exchanger shield for a snowmobile, the heat exchanger comprising an elongated body having a pair of opposing legs, and a pair of engagement structures, one engagement structure formed at a distal end of a corresponding one of the legs, wherein the engagement structures are structured and operable to slidingly engage a corresponding shield retention guide formed in a snowmobile heat exchanger.

20 Claims, 24 Drawing Sheets

Related U.S. Application Data filed on Aug. 23, 2022, provisional application No. 63/310,983, filed on Feb. 16, 2022.

(51) Int. Cl.

| | |
|---|---|
| *B62J 15/04* | (2006.01) |
| *B62K 3/02* | (2006.01) |
| *B62K 25/04* | (2006.01) |
| *B62M 27/02* | (2006.01) |

(58) Field of Classification Search
USPC .................................................. 180/190, 182
See application file for complete search history.

(56) References Cited

U.S. PATENT DOCUMENTS

| | | | |
|---|---|---|---|
| 3,529,494 | A | 9/1970 | Matte |
| 3,548,961 | A | 12/1970 | Newman |
| 3,658,358 | A | 4/1972 | Baker |
| 3,688,604 | A | 9/1972 | Schlosser |
| 3,688,856 | A | 9/1972 | Boehm et al. |
| 3,750,774 | A | 8/1973 | Trapp |
| 3,758,169 | A | 9/1973 | Trapp |
| 3,963,083 | A | 6/1976 | Reese |
| D255,560 | S | 6/1980 | Lapointe |
| 4,502,353 | A | 3/1985 | Beaudoin |
| 4,602,525 | A | 7/1986 | Moroto et al. |
| 4,667,758 | A | 5/1987 | Tamura |
| 4,892,165 | A | 1/1990 | Yasui et al. |
| 4,940,100 | A | 7/1990 | Ueda |
| 4,987,965 | A | 1/1991 | Bourret |
| 5,000,056 | A | 3/1991 | Crawford et al. |
| 5,152,255 | A | 10/1992 | Fukuda |
| 5,232,066 | A | 8/1993 | Schnelker |
| 5,251,718 | A | 10/1993 | Inagawa et al. |
| 5,586,614 | A | 12/1996 | Kouchi et al. |
| 5,599,002 | A | 2/1997 | Knutson |
| 5,660,245 | A | 8/1997 | Marier et al. |
| 5,862,662 | A | 1/1999 | Fukuda et al. |
| 5,924,514 | A | 7/1999 | Bullerdick |
| 5,957,230 | A | 9/1999 | Harano et al. |
| 6,073,998 | A * | 6/2000 | Siarkowski ............ A47C 7/748 |
| | | | 297/219.11 |
| 6,109,217 | A | 8/2000 | Hedlund et al. |
| D434,711 | S | 12/2000 | Mcquiston |
| 6,161,908 | A | 12/2000 | Takayama et al. |
| D436,336 | S | 1/2001 | Sadr |
| 6,170,589 | B1 | 1/2001 | Kawano et al. |
| 6,224,134 | B1 | 5/2001 | Johnson et al. |
| 6,266,250 | B1 | 7/2001 | Foye |
| 6,270,106 | B1 | 8/2001 | Maki et al. |
| 6,302,232 | B1 | 10/2001 | Forbes |
| 6,336,579 | B1 | 1/2002 | Sako |
| 6,419,533 | B2 | 7/2002 | Lecours |
| 6,446,744 | B2 | 9/2002 | Wubbolts et al. |
| D473,178 | S | 4/2003 | Schumacher |
| 6,561,297 | B2 | 5/2003 | Yatagai et al. |
| 6,561,302 | B2 | 5/2003 | Karpik |
| 6,604,594 | B2 | 8/2003 | Wubbolts et al. |
| 6,644,261 | B2 | 11/2003 | Morii et al. |
| 6,648,408 | B1 | 11/2003 | Grove |
| 6,651,764 | B2 | 11/2003 | Fournier et al. |
| 6,651,765 | B1 | 11/2003 | Weinzierl |
| 6,681,724 | B1 | 1/2004 | Berg |
| 6,695,087 | B2 | 2/2004 | Fournier et al. |
| 6,749,036 | B1 | 6/2004 | Schrapp et al. |
| 6,758,497 | B2 | 7/2004 | Bergman |
| 6,796,607 | B2 | 9/2004 | Bertrand et al. |
| 6,808,034 | B2 | 10/2004 | Nakano et al. |
| 6,823,957 | B2 | 11/2004 | Girouard et al. |
| 6,823,960 | B2 | 11/2004 | Shimizu et al. |
| 6,860,352 | B2 | 3/2005 | Mallette et al. |
| 6,860,826 | B1 | 3/2005 | Johnson |
| 6,880,658 | B2 | 4/2005 | Fournier et al. |
| 6,890,010 | B2 | 5/2005 | Bergman |

| | | | |
|---|---|---|---|
| D506,716 | S | 6/2005 | Hall et al. |
| 6,904,990 | B2 | 6/2005 | Etou |
| 6,923,284 | B2 | 8/2005 | Bédard et al. |
| 6,923,287 | B2 | 8/2005 | Morii |
| 6,926,107 | B2 | 8/2005 | Nishijima |
| 6,941,924 | B2 | 9/2005 | Morii et al. |
| 6,942,050 | B1 | 9/2005 | Honkala et al. |
| 6,942,052 | B1 | 9/2005 | Blakely |
| 6,951,523 | B1 | 10/2005 | Dieter et al. |
| 6,955,237 | B1 | 10/2005 | Przekwas et al. |
| 6,966,395 | B2 | 11/2005 | Schuehmacher et al. |
| 6,976,550 | B2 | 12/2005 | Vaisanen |
| 6,981,564 | B2 | 1/2006 | Bédard et al. |
| 7,011,173 | B2 | 3/2006 | Cadotte et al. |
| 7,025,161 | B2 | 4/2006 | Bertrand et al. |
| 7,032,561 | B2 | 4/2006 | Morii et al. |
| 7,036,619 | B2 | 5/2006 | Yatagai et al. |
| 7,048,293 | B2 | 5/2006 | Bédard |
| 7,063,178 | B2 | 6/2006 | Etou |
| 7,080,704 | B1 | 7/2006 | Kerner et al. |
| 7,083,024 | B2 | 8/2006 | Bergman et al. |
| 7,096,988 | B2 | 8/2006 | Moriyama |
| 7,104,352 | B2 | 9/2006 | Weinzierl et al. |
| 7,104,355 | B2 | 9/2006 | Hoi |
| 7,124,846 | B2 | 10/2006 | Bédard et al. |
| 7,124,847 | B2 | 10/2006 | Girouard et al. |
| 7,124,848 | B2 | 10/2006 | Girouard et al. |
| 7,128,176 | B1 | 10/2006 | Mills et al. |
| 7,140,463 | B2 | 11/2006 | Morii et al. |
| 7,147,074 | B1 | 12/2006 | Berg et al. |
| 7,150,336 | B2 | 12/2006 | Desmarais |
| 7,152,706 | B2 | 12/2006 | Pichler et al. |
| 7,188,693 | B2 | 3/2007 | Girouard et al. |
| 7,198,126 | B2 | 4/2007 | Vaisanen |
| 7,198,127 | B2 | 4/2007 | Yatagai et al. |
| 7,204,355 | B2 | 4/2007 | Akiyama et al. |
| 7,213,668 | B2 | 5/2007 | Richard et al. |
| 7,213,669 | B2 | 5/2007 | Fecteau et al. |
| 7,249,647 | B2 | 7/2007 | Nietlispach |
| 7,255,068 | B2 | 8/2007 | Ashida |
| 7,255,195 | B2 | 8/2007 | Haruna |
| 7,264,075 | B2 | 9/2007 | Schuemacher et al. |
| 7,281,598 | B2 | 10/2007 | Hoi |
| 7,296,645 | B1 | 11/2007 | Kerner et al. |
| 7,296,657 | B2 | 11/2007 | Ohno et al. |
| 7,300,382 | B2 | 11/2007 | Yamamoto |
| 7,303,037 | B2 | 12/2007 | Yatagai et al. |
| 7,328,765 | B2 | 2/2008 | Ebert et al. |
| 7,353,898 | B1 | 4/2008 | Bates, Jr. |
| 7,353,899 | B2 | 4/2008 | Abe et al. |
| 7,353,901 | B2 | 4/2008 | Abe et al. |
| 7,357,207 | B2 | 4/2008 | Vaeisaenen |
| 7,360,618 | B2 | 4/2008 | Hibbert et al. |
| 7,370,724 | B2 | 5/2008 | Saito et al. |
| 7,374,016 | B2 | 5/2008 | Yamaguchi et al. |
| 7,377,348 | B2 | 5/2008 | Girouard et al. |
| 7,389,842 | B2 | 6/2008 | Inoguchi et al. |
| 7,401,674 | B1 | 7/2008 | Berg et al. |
| 7,401,816 | B2 | 7/2008 | Abe et al. |
| 7,409,949 | B1 | 8/2008 | Zauner et al. |
| 7,410,182 | B1 | 8/2008 | Giese |
| 7,413,046 | B2 | 8/2008 | Okada et al. |
| 7,416,249 | B2 | 8/2008 | Atherley |
| 7,451,846 | B2 | 11/2008 | Wubbolts et al. |
| 7,458,593 | B2 | 12/2008 | Saito et al. |
| 7,472,771 | B2 | 1/2009 | Yatagai et al. |
| 7,475,751 | B2 | 1/2009 | Pard et al. |
| 7,484,584 | B1 | 2/2009 | Kerner et al. |
| 7,533,749 | B1 * | 5/2009 | Sampson ............... B62M 27/02 |
| | | | 180/190 |
| 7,540,511 | B2 | 6/2009 | Saito et al. |
| 7,543,669 | B2 | 6/2009 | Kelahaara |
| 7,543,672 | B2 | 6/2009 | Codere et al. |
| 7,556,114 | B2 | 7/2009 | Hanagan |
| 7,591,332 | B1 | 9/2009 | Bates, Jr. |
| 7,594,557 | B2 | 9/2009 | Polakowski et al. |
| 7,597,069 | B2 | 10/2009 | Ashida |
| 7,610,132 | B2 | 10/2009 | Yanai et al. |
| 7,708,096 | B2 | 5/2010 | Vezina |

(56)                References Cited

U.S. PATENT DOCUMENTS

| | | | |
|---|---|---|---|
| 7,753,154 B2 | 7/2010 | Maltais |
| 7,775,313 B1 | 8/2010 | Sampson et al. |
| 7,779,944 B2 | 8/2010 | Bergman et al. |
| 7,779,946 B2 | 8/2010 | Okada et al. |
| 7,789,184 B2 | 9/2010 | Maltais |
| 7,798,529 B2 | 9/2010 | Sato |
| 7,802,644 B2 | 9/2010 | Brodeur et al. |
| 7,802,645 B2 | 9/2010 | Mallette et al. |
| 7,802,646 B2 | 9/2010 | Matsudo |
| 7,806,215 B2 | 10/2010 | Codere et al. |
| D632,627 S | 2/2011 | Huang-tsai |
| 7,878,293 B2 | 2/2011 | Okada et al. |
| 7,913,785 B2 | 3/2011 | Korsumaki et al. |
| 7,918,299 B2 | 4/2011 | Yoshihara |
| 7,980,629 B2 | 7/2011 | Bedard |
| 7,997,372 B2 | 8/2011 | Maltais |
| 8,001,862 B2 | 8/2011 | Albulushi et al. |
| 8,028,795 B2 | 10/2011 | Hisanaga et al. |
| 8,037,961 B2 | 10/2011 | Fecteau |
| 8,127,877 B2 | 3/2012 | Fredrickson et al. |
| 8,167,073 B2 | 5/2012 | Polakowski et al. |
| 8,191,665 B1 | 6/2012 | Sampson et al. |
| 8,225,896 B2 | 7/2012 | Eichenberger et al. |
| 8,235,164 B2 | 8/2012 | Okada et al. |
| 8,240,417 B2 | 8/2012 | Takata |
| D669,025 S | 10/2012 | Spektor |
| 8,281,889 B2 | 10/2012 | Inoue |
| D673,890 S | 1/2013 | Bundy |
| D676,368 S | 2/2013 | Cover |
| 8,381,857 B1 | 2/2013 | Sampson et al. |
| 8,408,348 B2 | 4/2013 | Nakamura et al. |
| 8,430,197 B2 | 4/2013 | Matsudo |
| 8,453,779 B2 | 6/2013 | Vezina |
| 8,474,783 B2 | 7/2013 | Hu |
| 8,490,731 B2 | 7/2013 | Eaton et al. |
| 8,528,683 B2 | 9/2013 | Beavis et al. |
| 8,567,546 B2 | 10/2013 | Berg et al. |
| 8,590,654 B2 | 11/2013 | Kerner et al. |
| 8,607,912 B2 | 12/2013 | Mallette et al. |
| 8,657,054 B2 | 2/2014 | Mallette et al. |
| 8,733,773 B2 | 5/2014 | Sampson |
| 8,763,745 B2 | 7/2014 | Nagao et al. |
| 8,881,856 B2 | 11/2014 | Fecteau et al. |
| 8,919,477 B2 | 12/2014 | Conn et al. |
| 8,944,204 B2 | 2/2015 | Ripley et al. |
| 8,994,494 B2 | 3/2015 | Koenig et al. |
| 9,022,156 B2 | 5/2015 | Bedard et al. |
| 9,061,732 B1 | 6/2015 | Vezina |
| 9,073,604 B2 | 7/2015 | Mallette et al. |
| 9,090,313 B2 | 7/2015 | Bedard |
| 9,096,289 B2 | 8/2015 | Hedlund et al. |
| 9,114,852 B2 | 8/2015 | Fecteau et al. |
| D738,803 S | 9/2015 | Zhu |
| 9,139,255 B1 | 9/2015 | Glissmeyer et al. |
| 9,162,731 B2 | 10/2015 | Maltais |
| 9,228,581 B2 | 1/2016 | Bernier et al. |
| 9,284,004 B2 | 3/2016 | Inoue et al. |
| 9,327,789 B1 | 5/2016 | Vezina et al. |
| 9,346,508 B1 | 5/2016 | Lemieux |
| 9,346,518 B2 | 5/2016 | Polakowski et al. |
| 9,352,801 B2 | 5/2016 | Makitalo et al. |
| 9,352,802 B2 | 5/2016 | Sampson |
| 9,359,022 B2 | 6/2016 | Bedard et al. |
| 9,387,907 B2 | 7/2016 | Nasca et al. |
| 9,428,232 B2 | 8/2016 | Ripley et al. |
| 9,446,810 B2 | 9/2016 | Ripley |
| 9,481,370 B2 | 11/2016 | Bernier et al. |
| 9,540,072 B2 | 1/2017 | Hedulnd |
| 9,545,844 B2 | 1/2017 | Forty et al. |
| 9,610,986 B2 | 4/2017 | Conn |
| 9,618,071 B2 | 4/2017 | Hirota |
| D789,857 S | 6/2017 | Hare |
| D789,858 S | 6/2017 | Hare |
| 9,682,746 B2 | 6/2017 | Yasuda et al. |
| 9,683,492 B2 | 6/2017 | Bernier et al. |
| 9,688,354 B2 | 6/2017 | Nagao et al. |
| 9,694,872 B2 | 7/2017 | Laroche et al. |
| D794,525 S | 8/2017 | Chen |
| 9,738,301 B2 | 8/2017 | Vezina et al. |
| 9,751,552 B2 | 9/2017 | Mangum et al. |
| 9,751,592 B2 | 9/2017 | Labbe et al. |
| 9,789,930 B1 | 10/2017 | Vezina et al. |
| 9,796,437 B2 | 10/2017 | Wilson et al. |
| 9,809,195 B2 | 11/2017 | Giese et al. |
| 9,828,064 B2 | 11/2017 | Pard et al. |
| 9,828,065 B2 | 11/2017 | Pard |
| 9,845,004 B2 | 12/2017 | Hedlund et al. |
| D807,804 S | 1/2018 | Huang |
| 9,873,485 B2 | 1/2018 | Mangum et al. |
| D809,446 S | 2/2018 | Montoya et al. |
| D817,838 S | 5/2018 | Dionisopoulos et al. |
| D818,923 S | 5/2018 | Baeza |
| D818,924 S | 5/2018 | Baeza |
| 9,988,067 B1 | 6/2018 | Mangum et al. |
| 10,001,200 B2 | 6/2018 | Parraga Gimeno et al. |
| 10,029,567 B2 | 7/2018 | Lefebvre et al. |
| 10,035,554 B2 | 7/2018 | Mertens et al. |
| 10,065,708 B2 | 9/2018 | Labbe et al. |
| D833,940 S | 11/2018 | Dicanzio |
| 10,144,486 B2 | 12/2018 | Yasuda et al. |
| D840,309 S | 2/2019 | Huang |
| 10,195,999 B1 | 2/2019 | Glickman et al. |
| 10,202,169 B2 | 2/2019 | Mangum et al. |
| 10,215,083 B2 | 2/2019 | Vezina et al. |
| D842,791 S | 3/2019 | Zhu et al. |
| 10,232,910 B2 | 3/2019 | Mangum et al. |
| 10,259,507 B1 | 4/2019 | Johnson et al. |
| 10,293,885 B2 | 5/2019 | Vezina et al. |
| 10,300,989 B2 | 5/2019 | Vezina |
| 10,300,990 B2 | 5/2019 | Vezina |
| 10,358,187 B2 | 7/2019 | Vistad et al. |
| 10,377,446 B2 | 8/2019 | Thibault et al. |
| 10,392,079 B2 | 8/2019 | Vezina et al. |
| 10,406,910 B2 | 9/2019 | Vezina et al. |
| D864,827 S | 10/2019 | Dicanzio |
| 10,435,059 B2 | 10/2019 | Mallette et al. |
| 10,450,968 B2 | 10/2019 | Bernier et al. |
| D867,252 S | 11/2019 | Lanini et al. |
| D868,661 S | 12/2019 | Li |
| 10,513,970 B2 | 12/2019 | Vezina et al. |
| 10,526,045 B2 | 1/2020 | Vezina et al. |
| 10,538,262 B2 | 1/2020 | Mangum et al. |
| 10,543,792 B2 | 1/2020 | Yoshioka et al. |
| 10,556,635 B2 | 2/2020 | Murayama et al. |
| 10,597,105 B2 | 3/2020 | Lefebvre et al. |
| 10,604,076 B2 | 3/2020 | Lanini et al. |
| 10,619,615 B2 | 4/2020 | Dale et al. |
| 10,675,962 B2 | 6/2020 | Urabe et al. |
| 10,676,157 B2 | 6/2020 | Vigen |
| D890,671 S | 7/2020 | Dicanzio |
| 10,730,576 B2 | 8/2020 | Labbe et al. |
| 10,766,571 B2 | 9/2020 | Sampson et al. |
| 10,766,572 B2 | 9/2020 | Pard et al. |
| 10,766,573 B2 | 9/2020 | Vezina et al. |
| 10,773,684 B2 | 9/2020 | Koenig et al. |
| 10,773,774 B2 | 9/2020 | Mangum et al. |
| 10,780,949 B2 | 9/2020 | Crain et al. |
| 10,793,226 B2 | 10/2020 | Crain et al. |
| 10,800,458 B2 | 10/2020 | Makowski et al. |
| 10,800,490 B2 | 10/2020 | Foxhall et al. |
| 10,814,935 B2 | 10/2020 | Vaisanen et al. |
| 10,822,054 B2 | 11/2020 | Lemieux |
| 10,829,174 B2 | 11/2020 | Baruzzo |
| 10,843,758 B2 | 11/2020 | Hebert et al. |
| 10,850,787 B2 | 12/2020 | González et al. |
| 10,870,465 B2 | 12/2020 | Crain et al. |
| 10,875,595 B2 | 12/2020 | Laberge et al. |
| 10,875,605 B2 | 12/2020 | Pard |
| 10,899,415 B2 | 1/2021 | Mangum et al. |
| D909,944 S | 2/2021 | Mcdowell |
| 10,913,512 B2 | 2/2021 | Thompson et al. |
| 10,960,914 B2 | 3/2021 | Mangum et al. |
| D915,974 S | 4/2021 | Mcdowell |
| 10,974,790 B2 | 4/2021 | Hosaluk et al. |

(56) References Cited

U.S. PATENT DOCUMENTS

| | | | | |
|---|---|---|---|---|
| 11,027,794 | B2 | 6/2021 | Vigen | |
| 11,097,793 | B2 | 8/2021 | Marchildon et al. | |
| 11,110,994 | B2 | 9/2021 | Hedlund et al. | |
| D933,560 | S | 10/2021 | Williams | |
| 11,142,286 | B2 | 10/2021 | Sampson et al. | |
| 11,208,168 | B2 * | 12/2021 | Hedlund | B62K 19/24 |
| 11,214,320 | B2 | 1/2022 | Bates et al. | |
| 11,220,310 | B2 | 1/2022 | Pard et al. | |
| 11,225,302 | B2 | 1/2022 | Vigen | |
| 11,230,351 | B2 | 1/2022 | Vezina | |
| 11,235,634 | B2 | 2/2022 | Lavallee et al. | |
| D944,702 | S | 3/2022 | Li | |
| 11,267,407 | B2 | 3/2022 | Hedlund et al. | |
| 11,286,019 | B2 | 3/2022 | Hedlund et al. | |
| D950,451 | S | 5/2022 | Li | |
| D954,625 | S | 6/2022 | Liang | |
| 11,358,661 | B2 | 6/2022 | Laugen et al. | |
| 11,384,679 | B2 | 7/2022 | Matsumoto et al. | |
| D961,479 | S | 8/2022 | Kaoud et al. | |
| 11,415,207 | B2 | 8/2022 | Pard et al. | |
| D968,298 | S | 11/2022 | Chen | |
| 11,505,263 | B2 | 11/2022 | Hedlund et al. | |
| 11,524,569 | B2 | 12/2022 | Vezina et al. | |
| 2001/0027886 | A1 * | 10/2001 | Ishii | B62M 27/02 |
| | | | | 180/190 |
| 2001/0047900 | A1 | 12/2001 | Fecteau et al. | |
| 2002/0027028 | A1 * | 3/2002 | Girouard | B62M 27/02 |
| | | | | 280/847 |
| 2003/0127265 | A1 | 7/2003 | Watson et al. | |
| 2003/0151278 | A1 | 8/2003 | Bertrand et al. | |
| 2003/0201637 | A1 | 10/2003 | Bergman | |
| 2004/0012233 | A1 | 1/2004 | Branscomb | |
| 2004/0090119 | A1 | 5/2004 | Ebert et al. | |
| 2005/0016784 | A1 | 1/2005 | Fecteau | |
| 2005/0040707 | A1 * | 2/2005 | Ebert | B62M 27/02 |
| | | | | 305/185 |
| 2005/0121876 | A1 | 6/2005 | Gaudreau et al. | |
| 2005/0241867 | A1 | 11/2005 | Abe et al. | |
| 2006/0162977 | A1 | 7/2006 | Etou | |
| 2007/0193715 | A1 | 8/2007 | Bergman et al. | |
| 2007/0230198 | A1 | 10/2007 | Ohzono | |
| 2008/0277184 | A1 | 11/2008 | Marleau | |
| 2009/0206626 | A1 | 8/2009 | Bedard | |
| 2011/0132679 | A1 | 6/2011 | Kerner | |
| 2011/0168477 | A1 | 7/2011 | Yokomori et al. | |
| 2012/0205902 | A1 | 8/2012 | Beavis et al. | |
| 2013/0032418 | A1 | 2/2013 | Ripley et al. | |
| 2013/0080007 | A1 | 3/2013 | Monfette et al. | |
| 2013/0175106 | A1 | 7/2013 | BÉdard et al. | |
| 2013/0206494 | A1 | 8/2013 | Hedlund et al. | |
| 2014/0076648 | A1 | 3/2014 | Giese et al. | |
| 2014/0332293 | A1 | 11/2014 | Conn | |
| 2015/0021898 | A1 | 1/2015 | Serbinski | |
| 2016/0068227 | A1 | 3/2016 | Yasuda et al. | |
| 2016/0152304 | A1 * | 6/2016 | Vezina | B62B 17/06 |
| | | | | 280/845 |
| 2017/0036604 | A1 | 2/2017 | Campbell et al. | |
| 2017/0101142 | A1 | 4/2017 | Hedlund et al. | |
| 2018/0141616 | A1 | 5/2018 | Pard et al. | |
| 2018/0334211 | A1 * | 11/2018 | Mertens | B62M 27/02 |
| 2019/0144074 | A1 | 5/2019 | Vigen | |
| 2019/0233055 | A1 | 8/2019 | Vezina | |
| 2019/0256170 | A1 | 8/2019 | Labbe | |
| 2019/0344657 | A1 | 11/2019 | Vezina et al. | |
| 2019/0344859 | A1 | 11/2019 | Vistad et al. | |
| 2020/0086940 | A1 | 3/2020 | Sturgeon et al. | |
| 2020/0148056 | A1 | 5/2020 | Forty et al. | |
| 2020/0224628 | A1 | 7/2020 | Dale et al. | |
| 2020/0398785 | A1 | 12/2020 | Koenig et al. | |
| 2021/0039558 | A1 | 2/2021 | Rucker et al. | |
| 2021/0053652 | A1 | 2/2021 | Fuchs et al. | |
| 2021/0053653 | A1 | 2/2021 | Mangum et al. | |
| 2021/0086840 | A1 | 3/2021 | Glickman et al. | |
| 2021/0114525 | A1 | 4/2021 | Mazzarella | |
| 2021/0115835 | A1 | 4/2021 | Diehl et al. | |

| | | | |
|---|---|---|---|
| 2021/0122445 | A1 | 4/2021 | Thompson et al. |
| 2021/0129943 | A1 | 5/2021 | Mangum et al. |
| 2021/0163086 | A1 | 6/2021 | Mallette et al. |
| 2021/0188182 | A1 | 6/2021 | Edwards et al. |
| 2021/0188185 | A1 | 6/2021 | Hedlund et al. |
| 2021/0188376 | A1 | 6/2021 | Laugen et al. |
| 2021/0188382 | A1 | 6/2021 | Hedlund |
| 2021/0213899 | A1 | 7/2021 | Yotsuyanagi et al. |
| 2021/0214044 | A1 | 7/2021 | Krings et al. |
| 2021/0229731 | A1 | 7/2021 | Stoxen et al. |
| 2021/0237652 | A1 | 8/2021 | Mazzarella |
| 2021/0245837 | A1 | 8/2021 | Vigen |
| 2021/0323629 | A1 | 10/2021 | Blackburn et al. |
| 2021/0347432 | A1 | 11/2021 | Halvorson |
| 2021/0362807 | A1 | 11/2021 | Hedlund et al. |
| 2022/0009419 | A1 | 1/2022 | Kim et al. |
| 2022/0024541 | A1 | 1/2022 | Korsumaki |
| 2022/0097801 | A1 | 3/2022 | Vigen |
| 2022/0111929 | A1 | 4/2022 | Matsushita |
| 2022/0119049 | A1 | 4/2022 | Bates et al. |
| 2022/0132679 | A1 | 4/2022 | Han |
| 2022/0144182 | A1 | 5/2022 | Hedlund et al. |
| 2022/0177077 | A1 | 6/2022 | Vistad et al. |
| 2022/0212754 | A1 | 7/2022 | Stock et al. |
| 2022/0340233 | A1 | 10/2022 | Edwards et al. |
| 2022/0349339 | A1 | 11/2022 | Schuehmacher et al. |
| 2023/0052282 | A1 | 2/2023 | Hedlund et al. |
| 2023/0257049 | A1 | 8/2023 | Vigen et al. |
| 2023/0257067 | A1 | 8/2023 | Langaas et al. |
| 2024/0124096 | A1 | 4/2024 | Crosby et al. |
| 2025/0256809 | A1 | 8/2025 | Christian et al. |

FOREIGN PATENT DOCUMENTS

| | | | | | |
|---|---|---|---|---|---|
| CA | 2456088 | C | | 3/2005 | |
| CA | 2411964 | C | | 7/2005 | |
| CA | 2371477 | C | | 7/2006 | |
| CA | 2363856 | C | | 1/2008 | |
| CA | 2639857 | A1 | | 6/2009 | |
| CA | 2877554 | A1 | | 1/2014 | |
| CA | 2987534 | A1 | | 12/2016 | |
| CA | 2925800 | A1 | | 10/2017 | |
| CA | 2925822 | A1 | | 10/2017 | |
| CA | 3117886 | A1 | | 5/2020 | |
| CA | 2863952 | C | | 6/2020 | |
| CA | 3030691 | C | | 10/2020 | |
| CA | 3103308 | A1 | | 6/2021 | |
| CN | 1898521 | A | * | 1/2007 | F28F 9/002 |
| CN | 105422273 | A | | 3/2016 | |
| JP | S55125312 | A | | 9/1980 | |
| JP | H10217921 | A | | 8/1998 | |
| JP | 2005193788 | A | | 7/2005 | |
| JP | 4840406 | B2 | | 10/2011 | |
| JP | 2019172095 | A | | 10/2019 | |
| WO | 8607423 | A1 | | 12/1986 | |
| WO | WO-2008028817 | A1 | * | 8/2007 | B21D 39/06 |
| WO | 2009114414 | A1 | | 9/2009 | |
| WO | 2019064912 | A1 | | 4/2019 | |

OTHER PUBLICATIONS

"Van Amburg (VEI) Polaris Pro Short Rear Bumper Install" https://www.snowest.com/forum/threads/van-amburg-vei-polaris-pro-short-rear-bumper-install.386413/ (Accessed: Apr. 22, 2022).

"Arctic Cat New OEM Tunnel Snow Flap/Guard CF, CFR, M, Sno Pro, M8 M6 CFR8 M1000 CF8" https://www.amazon.ca/Arctic-Tunnel-Snow-Guard-M1000/dp/B01DUY2GCW (Accessed: Apr. 22, 2022).

"2007 Arctic Cat Jaguar Z1 Next Generation Performance 4-Stroke", Snowtech Magazine, retrieved May 26, 2022 from https://www.snowtechmagazine.com/2007-arctic-cat-jaguar-z1-next-generation-performance-4-stroke/, Sep. 20, 2006.

"Arctic Cat Snowmobile Pro Mountain Running Boards", https://www.motorsportsgear.ca/products/arctic-cat-snowmobile-pro-mountain-running-boards?variant=30718958272561, 2 Pages.

"Cooling Assembly Arctic Cat, Snowmobile, 1997 ZR 440 [97ZRA-1997-22-25]", https://www.countrycat.com/arctic-cat-parts?gclid=

(56)　　　　　References Cited

OTHER PUBLICATIONS

EA1a1QobChMI7O-P-JzGgAMVdqtaBR1Dbg33EAAYASABEgKGPvD_BWE#/Arctic_Cat/1997_ZR_440 %5b97ZRA-1997-22-25%5d/COOLING_ASSEMBLY_%5b65743%5d/97ZRA-1997-22-25/65743/y.

"English Translation of CN 102832746", 2025,.

"Front Frame and Footrest Assembly [65748]", https://www.countrycat.com/arctic-cat-parts?gclid=EA1a1QobChMI7O-P-JzGgAMVdqtaBR1Dbg33EAAYASABEgKGPvD_BwE#/Arctic_Cat/1997_ZR_440_%5b97ZRA-1997-22-25%5d/FRONT_FRAME_AND_FOOTREST_ASSEMBLY_%5b65748%5d/97ZRA-1997-22-25/65748/y.

"Running Board Support Bracket", https://www.countrycat.com/arctic-cat-parts?gclid=EA1a1QobChMI7O-P-JzGgAMVdqtaBR1Dbg33EAAYASABEgKGPvD_BWE#/Arctic_Cat/1992_PANTHER_%5b0650-173-1992-17-02%5d/TUNNEL_AND_REAR_BUMPER_%5b59192%5d/0650-173-1992-17-02/59192/y, 1992 Arctic Cat Panther Photos taken Jul. 26, 2023.

"Tunnel and Rear Bumper [65742]—1997 ZR 440 [97ZRA-1997-22-25]", https://www.countrycat.com/arctic-cat-parts?gclid=EA1a1QobChMI7O-P-JzGgAMVdqtaBR1Dbg33EAAYASABEgKGPvD_BWE#/Arctic_Cat/1997_ZR_440_%5b97ZRA-1997-22-25%5d/TUNNEL_AND_REAR_BUMPER_%5b65742%5d/97ZRA-1997-22-25/65742/y.

Watson, Captain Jamesr. , "Fiber-Reinforced Composites", article dated 'Spring' 1997, accessed Jul. 25, 2025 at: https:// www. epoxyworks.com/fiber-reinforced-composites/ (Year: 1997), 1997, 8 Pages.

"NEW Pro Ride/AXYS Snow Flaps now available!", Dec. 20, 2016 and Dec. 21, 2016 https://www.hardcoresledder.com/threads/new-pro-ride-axys-snow-flaps-now-available.1663618/.

"Ski-Dao New OEM Snow Flap Guard Black/Silver REV 520000704" https://leadersrpmshop.com/ (Accessed: Oct. 31, 2002).

* cited by examiner

SNOW VEHICLE HEAT EXCHANGER SHIELD

CROSS-REFERENCE TO RELATED APPLICATIONS

This application claims the benefit of U.S. Provisional Application No. 63/402,768, filed on Aug. 31, 2022, U.S. Provisional Application No. 63/400,056, filed on Aug. 23, 2022, and to U.S. Provisional Application No. 63/310,983, filed on Feb. 16, 2022. The disclosures of the above applications are incorporated herein by reference in their entirety.

FIELD

The present teachings relate to snow vehicles, and more particularly to heat exchanger shields for a snow vehicle.

BACKGROUND

The statements in this section merely provide background information related to the present disclosure and may not constitute prior art.

Conventional snowmobiles typically include aluminum track tunnels that cover and box-in the drive track and protect the rider from snow. Additionally, in many instance the tunnels help to direct snow from the drive track toward an engine heat exchanger, or radiator mounted to the underside of the tunnel. On many known snowmobiles metal spikes or studs are connected to, embedded in, or otherwise disposed on the snowmobile drive track to improve traction. During use of the snowmobile the drive track and suspension are subject to move up and down, whereby the spikes or studs can strike or contact the heat exchanger and possibly puncture or otherwise damage the heat exchanger.

SUMMARY

In various embodiments the present disclosure provides a heat exchanger shield for a snowmobile, the heat exchanger comprising an elongated body having a pair of opposing legs, and a pair of engagement structures, one engagement structure formed at a distal end of a corresponding one of the legs, wherein the engagement structures are structured and operable to slidingly engage a corresponding shield retention guide formed in a snowmobile heat exchanger.

In various other embodiments, the present disclosure provides a heat exchanger shield assembly for a snowmobile, wherein the shield assembly comprises a heat exchanger shield comprising an elongated body having a pair of opposing legs, and a pair of engagement structures, one engagement structure formed at a distal end of a corresponding one of the legs, wherein the engagement structures are structured and operable to slidingly engage a corresponding shield retention guide formed in a snowmobile heat exchanger. The snowmobile heat exchanger shield assembly additionally comprises a heat exchanger shield mounting bracket that is connectable to the heat exchanger shield and is structured and operable to secure the heat exchanger shield within the shield retention guides.

In yet other various embodiments, the present disclosure provides a heat exchanger and shield assembly for a snowmobile. The exchanger and shield assembly comprises a heat exchanger, wherein the heat exchanger comprises a main body; and a plurality of exchanger shield retention guides protruding from the main body. The heat exchanger and shield assembly additionally comprises a snowmobile heat exchanger shield, wherein the heat exchanger shield comprises an elongated body having a pair of opposing legs, and a pair of engagement structures, one engagement structure formed at a distal end of a corresponding one of the legs. The engagement structures are structured and operable to slidingly engage the shield retention guides.

In still other embodiments, the present disclosure provides heat exchanger and shield assembly for a snowmobile, wherein the exchanger and shield assembly comprises a heat exchanger that includes a main body and a plurality of exchanger shield retention guides protruding from the main body. Each exchanger shield retention guide comprises a retention fingers formed on distal ends thereof that angles inward and defines a retention channel between adjacent shield retention guides. The heat exchanger and shield assembly additionally comprises a heat exchanger shield assembly, where the heat exchanger shield assembly comprises a heat exchanger shield having an elongated body having a pair of opposing legs and a pair of engagement structures, one engagement structure formed at a distal end of a corresponding one of the legs, wherein the engagement structures are structured and operable to be slidingly inserted into the heat exchanger retention guides to slidingly engage the exchanger shield retention guides. The heat exchanger shield assembly further includes and a heat exchanger shield mounting bracket that is connectable to the heat exchanger shield and is structured and operable to secure the heat exchanger shield within the shield retention guides.

In still yet other various embodiments, the present disclosure provides a snowmobile comprising a chassis, a drive track operably connected to the chassis and structured and operable to rotate to propel the snowmobile across snow, a prime mover mounted to the chassis and structured and operable to provide motive power to the drive track, a drive track tunnel connected to the chassis and structured and operable to at least partially house at least a portion of the drive track, and a bumper/hand bar is mounted to the chassis and to which the drive track tunnel is further mounted. The snowmobile additionally comprises a heat exchanger and shield assembly that includes a heat exchanger that includes a main body and a plurality of exchanger shield retention guides protruding from the main body. Each exchanger shield retention guide comprises a retention fingers formed on distal ends thereof that angles inward and defines a retention channel between adjacent shield retention guides. The heat exchanger and shield assembly additionally comprises a heat exchanger shield assembly, where the heat exchanger shield assembly comprises a heat exchanger shield having an elongated body having a pair of opposing legs and a pair of engagement structures, one engagement structure formed at a distal end of a corresponding one of the legs, wherein the engagement structures are structured and operable to be slidingly inserted into the heat exchanger retention guides to slidingly engage the exchanger shield retention guides. The heat exchanger shield assembly further includes and a heat exchanger shield mounting bracket that is connectable to the heat exchanger shield and is structured and operable to secure the heat exchanger shield within the shield retention guides.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments.

Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
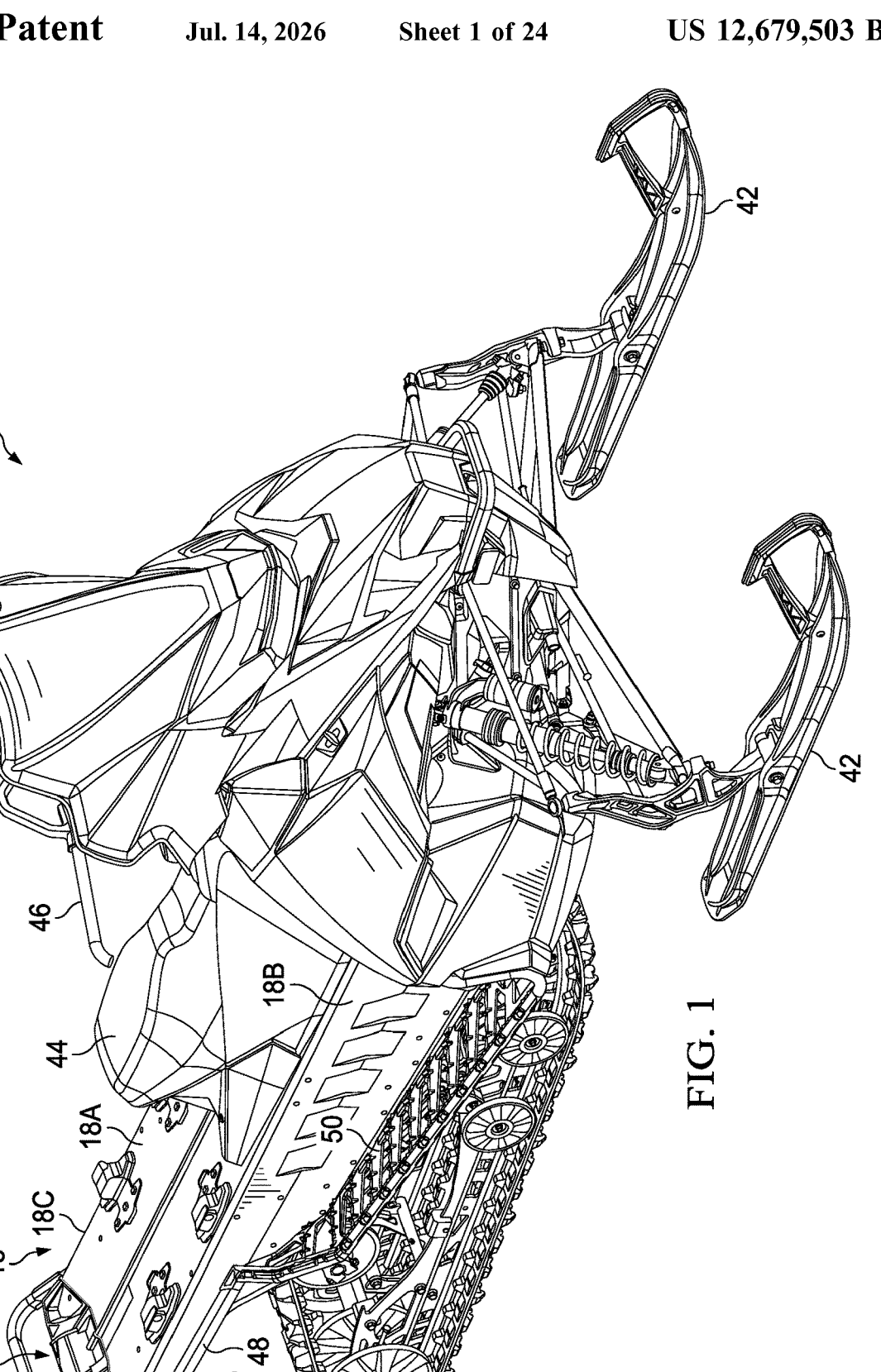
FIG. 1 is an exemplary isometric view of a snowmobile comprising a taillight and snow flap assembly in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts or causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

Figure 2:
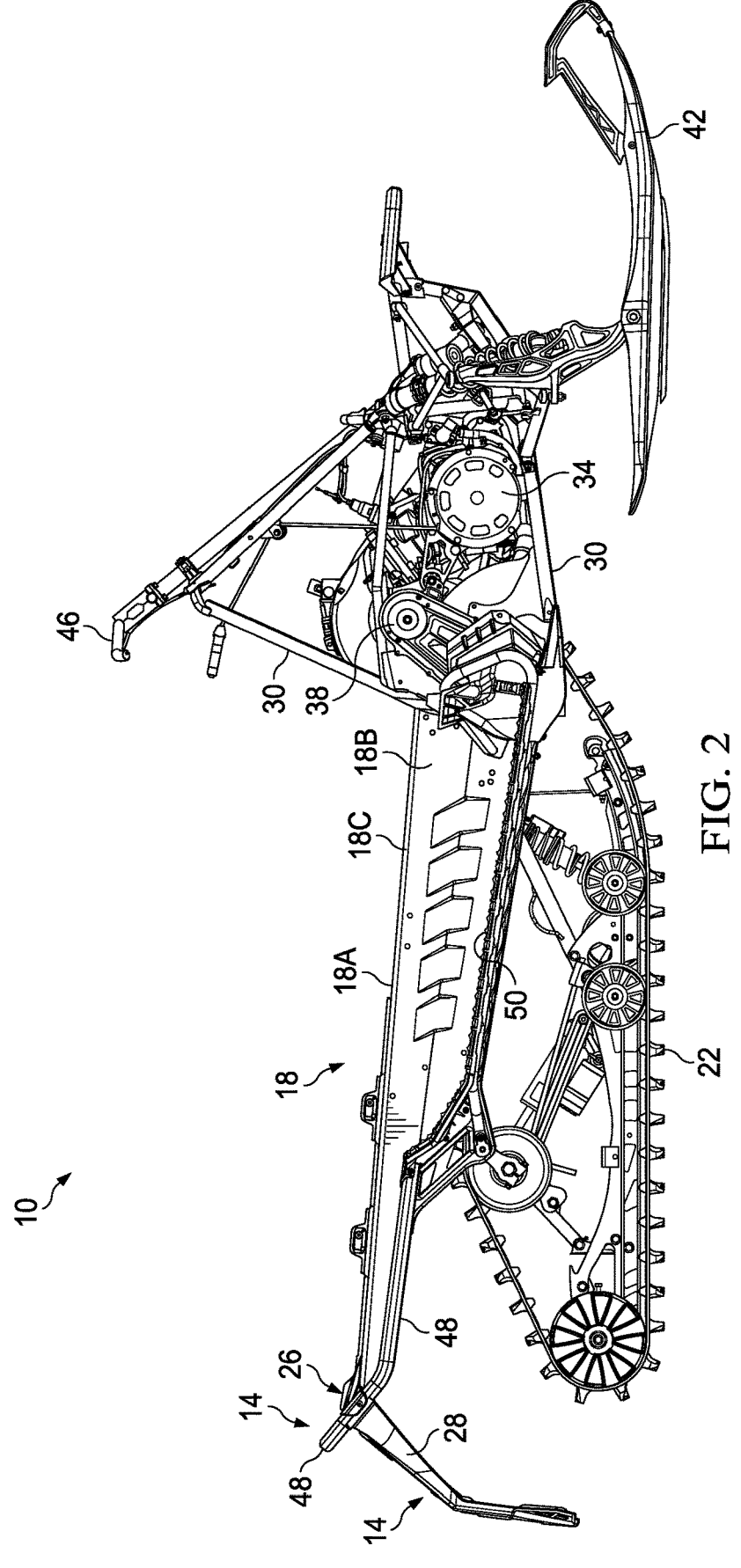
FIG. 2 is an exemplary side view of the snowmobile comprising the taillight and snow flap assembly in accordance with various embodiments of the present disclosure.
Figure 3:
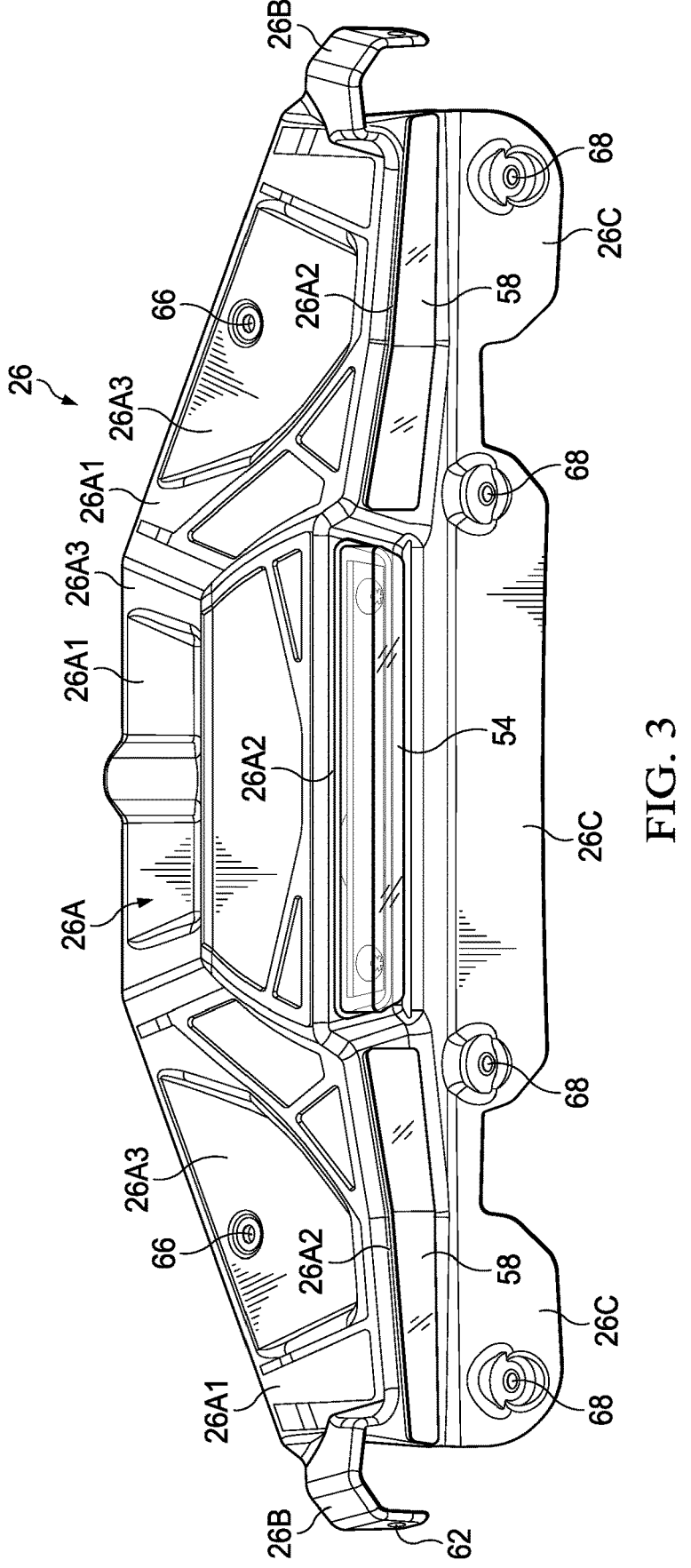
FIG. 3 is an exemplary isometric view of a taillight housing fixture of the taillight and snow flap assembly shown in FIGS. 1 and 2 in accordance with various embodiments of the present disclosure.
Figure 4:
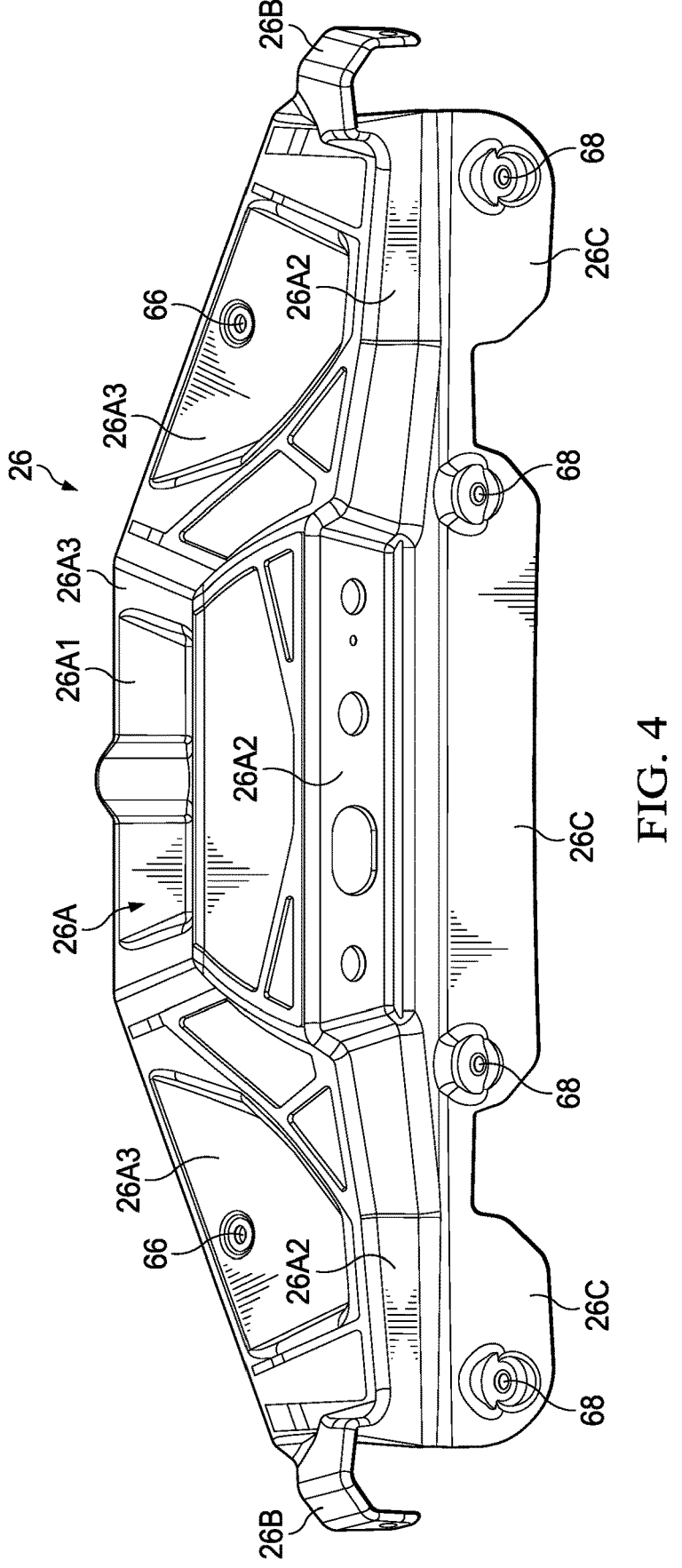
FIG. 4 is an exemplary rear view of the taillight housing fixture of the taillight and snow flap assembly shown in FIG. 3 in accordance with various embodiments of the present disclosure.
Figure 5:
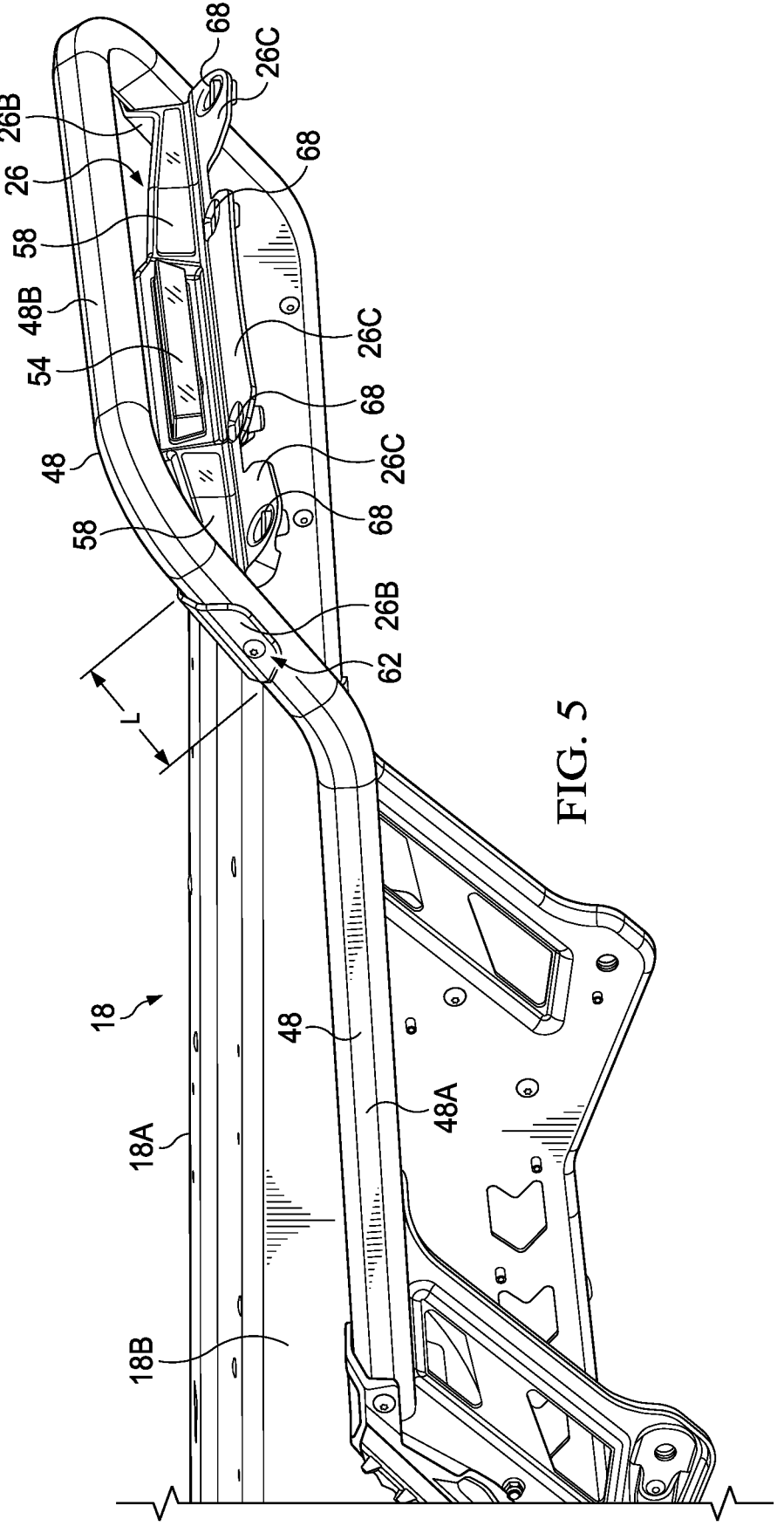
FIG. 5 is an exemplary isometric view of a tunnel and a bumper/hand bar of a snowmobile having the taillight housing fixture shown in FIGS. 3 and 4 mounted to the tunnel and the bumper/hand bar in accordance with various embodiments of the present disclosure.
Figure 6:
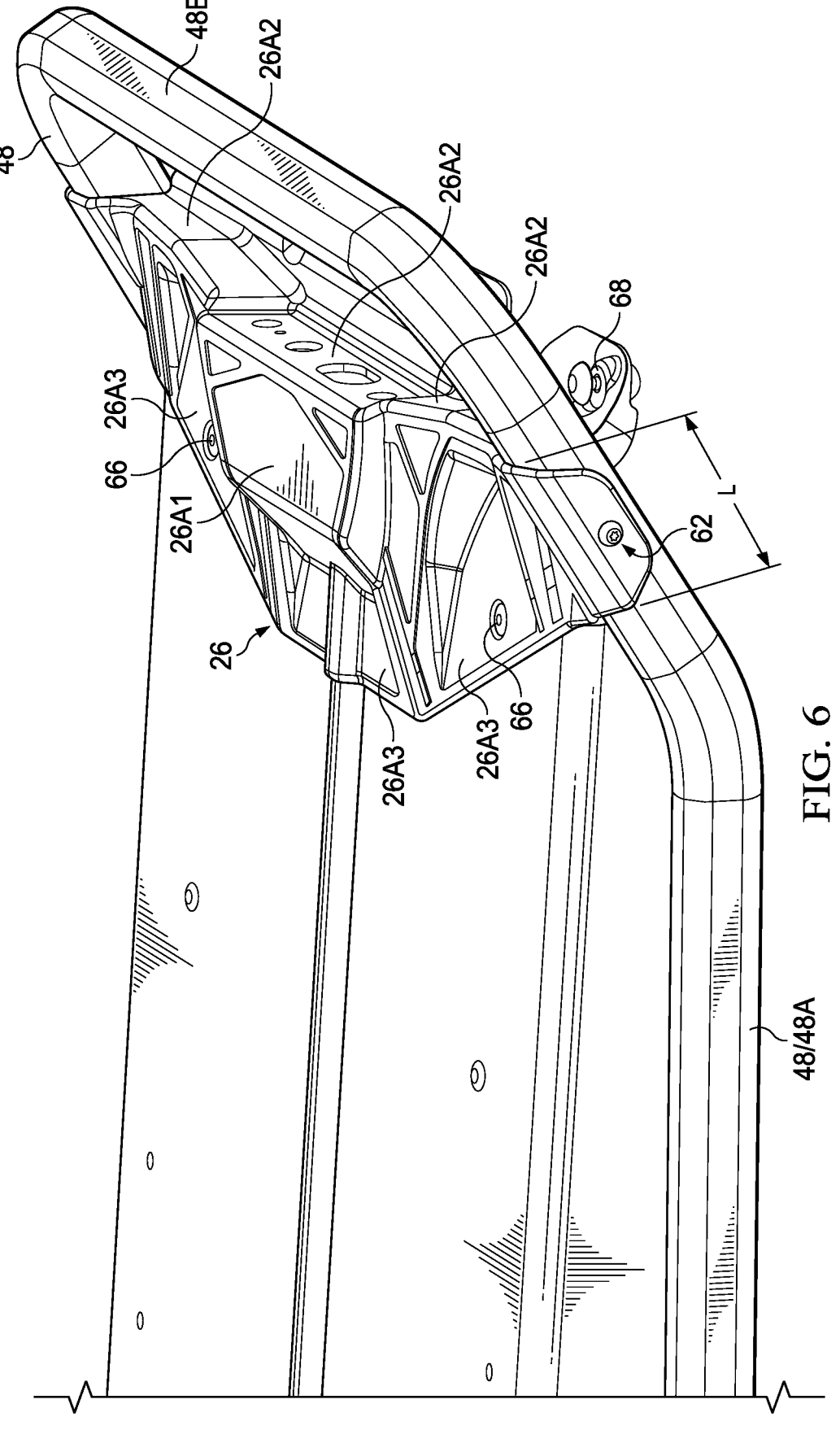
FIG. 6 is an exemplary top isometric view of the taillight housing fixture shown in FIG. 5 mounted to the tunnel and the bumper/hand bar in accordance with various embodiments of the present disclosure.

Referring to FIGS. 1 and 2, in various embodiments the present disclosure provides snowmobile 10 comprising a taillight housing and a snow flap that may be used separately or together as an assembly 14. One or both components of the assembly can be structured and operable to provide structural reinforcement, rigidity, strength and stability to a drive track tunnel 18 (referred to herein simply as the tunnel 18) and to direct snow thrown from a drive track 22 of the snowmobile 10 onto a heat exchanger 24 for an internal combustion engine or a component of an electric vehicle such as a battery or motor (see FIG. 14 through 17) disposed on an underside of the tunnel 18. The taillight housing and snow flap assembly 14 comprises a taillight housing fixture 26 and a snow flap 28 connected to taillight housing fixture 26 The snowmobile 10 additionally generally comprises a chassis or frame 30, the tunnel 18 connected to the chassis 30, a prime mover 34 (e.g., an internal combustion engine (ICE) and/or an electric motor) mounted to the chassis 30, the drive track 22 disposed within the tunnel 18 and operatively connected to a drivetrain 38, which is operatively connected to the prime mover 34 and configured to provide motive power provided by the prime mover 34 to the drive track 22 to thereby propel the snowmobile 10. The snowmobile 10 further includes an operator/passenger seat 44, at least one ski 42 (e.g., in various instances two skis 42) operably connected to a steering mechanism 46 (e.g., a steering wheel or steering handlebars) that is used by the snowmobile operator to control the direction of travel or movement of the snowmobile 10, and a bumper/hand bar 48 that is mounted to the chassis 30. It should be understood that the snowmobile 10 can be any snow vehicle such as snowmobiles, snow bikes, or any other tracked vehicle that utilizes a heat exchanger disposed on an underside of a tunnel of the respective vehicle.

The tunnel 18 is mounted to the chassis 30 and provides a main body portion of the snowmobile 10. The tunnel 18 generally houses a portion of the drivetrain 38 and an upper portion of the drive track 22 as the drive track 22 is disposed on and travels around a track guide and drive assembly (e.g., the drive gears, idler gears, high-fax/slide rail, rear suspension, etc.). The tunnel 18 comprises a main panel 18A and opposing side panels 18B extending at an angle (e.g., generally orthogonally or any other desired angle) from opposing lateral edges 18C of the main panel 18A to form a three-sided tunnel or channel. As described above, the tunnel provides a main portion of the snowmobile body to which various components (e.g., seat 44, the heat exchanger 24, and a pair of opposing running boards 50) can be mounted, attached or connected. The tunnel 18 also provides protection to the snowmobile operator/passenger from the rotating drive track 22, the drivetrain 38, and snow, rocks, ice, sticks and other debris thrown up by the rotating drive track 22. The tunnel 18 can be constructed or fabricated of any material suitable to provide the desired shape and structure of the tunnel 18 as described herein. For example, in various instances the tunnel 18 can be fabricated of a light gauge sheet metal, a fiber reinforced polymer, additive manufacturing, or any other suitable metal, polymer or plastic composite or compound. In a non-limiting example, the main panel 18A and the side panels 18B may be integrally formed from a single sheet of material, or comprised of separate components fastened together. Due to the light weight and three-sided structure of the tunnel 18, the tunnel 18 is generally subject to be pliable or flexible in that it can flex, bend and twist absent further reinforcement such as the bumper/hand bar 48 and taillight housing fixture 26 described herein below.

Referring now to FIGS. 3, 4, 5, 6 and 7, as described above, the taillight housing and snow flap assembly 14 can be structured and operable to provide structural reinforcement, rigidity, strength and stability to the tunnel 18. More particularly, the taillight housing fixture 26 is structured and operable to provide structural reinforcement, rigidity, strength and stability to the tunnel 18 such that flexing, bending and twisting of the tunnel 18 is reduced or prevented. In various embodiments, the tunnel 18 is connected to the bumper/hand bar 48, which can also add structural reinforcement, rigidity, strength and stability to the tunnel 18. The taillight housing fixture 26 can be constructed or fabricated of any material suitable to provide the desired shape and structure of the taillight housing fixture 26 as described herein. For example, in various instances the taillight housing fixture can be fabricated of a light gauge stamped sheet metal, a fiber reinforced polymer, additive manufacturing, or any other suitable metal, polymer or plastic composite or compound. In an illustrative example, the taillight housing fixture 26 is a structural composite material comprising glass fibers in a polymer matrix.

More Particularly, in various embodiments, the taillight housing fixture 26 can be fabricated of a polymer composite that includes Nylon 6/6 or Nylon 12, Polyetheretherketone (PEEK), Polypropylene (PP), polybutylene terephthalate (PBT), or Polyphthalamide (PPA) matrix material with glass, carbon, or ratio of both carbon and fiber material for fiber fill varying in percent volume from 50% to 60%. For example, the taillight housing fixture 26 can be manufactured of a molded composite material, such as a glass filled long-fiber material. Portions of the taillight housing fixture 26 can have differing thickness to optimize stiffness and weight. For example, the main body 26A can include more thickness and structural support ribbing as opposed to the retention wings 26B and/or the flap mounting tail 26C in order meet stiffness requirements. For example, in various exemplary embodiments, the taillight housing fixture 26 can be fabricated can be fabricated of a composite including one or more of the above-described polymers and one or more types of fibers including, but not limited to, glass and/or carbon fibers, e.g., 50 wt % glass filled polyamide. In a non-limiting example, the fiber % by weight of the composite material can range from 20 wt % to 60 wt %, and can optionally be in the range of 40 wt % to 50 wt %. These materials have the advantages of being tough enough to withstand impacts while also being flexible enough to withstand any torquing and/or twisting of the bumper/hand bar 48 and tunnel 18 during use of the snowmobile 10. In addition, these polymeric composite materials have a low thermal conductivity (i.e., less than 1 W/m-° K).

The taillight housing fixture 26 comprises a main body 26A having a top surface 26A1 and a rear lens face 26A2 extending downward from a trailing or rearward edge of the top surface 26A1. One or more illumination or light fixture (i.e., at least one light bulb, LED or other illumination device housed within a lens housing) and/or lens 54 (e.g., brake light fixture and/or lens, direction indicator light fixture and/or lens, running light fixture and/or lens, etc.) and/or one or more reflector or reflective lens 58 can be removably or fixedly mounted to the rear lens face 26A2. The taillight housing fixture 26 additionally comprises a pair of opposing retention arms or wings 26B extending from opposing lateral ends of the main body 26A and a flap mounting tail 26C extending longitudinally rearwardly outward at an angle (e.g., 30° to 90°) from a bottom of the rear lens face 26A2 of the main body 26A. As used herein longitudinal will refer to a direction or relationship of components or elements that extends from the front to the back of the snowmobile 10 and/or vice-versa. And, as used herein lateral will refer to a direction or relationship of components or elements that extends from the side to the side of the snowmobile 10. The retention wings 26B extend laterally outward from the lateral ends of the main body 26 having a curved or a C-like shape that is contoured and shaped to mate or match with the shape and contour of an outer surface of the bumper/hand bar 48 such that each retention wing 26B can be disposed over and snuggly or tightly fit over or mate with opposing side portions of the bumper/hand bar 48. Additionally, the retention wings 26B have a longitudinal length L and at least one fastening orifice 62. The fastening orifice(s) 62 is/are structured and operable to have a fastener (e.g., screw, rivet, bolt, expanding push fastener, etc.) inserted therethrough to attach and secure the taillight housing fixture 26 to the bumper/hand bar 48. In a non-limiting example, the retention wings 26B are removably fastened to the bumper/hand bar 48.

The length L of the retention wings 26B is designed and structured to provide stability to taillight housing fixture 26 when the taillight housing fixture is secured to the bumper/hand bar 48. More specifically, the length L of the retention wings 26B is designed and structured to have a length (e.g., 3, 4, 5, 6 or more inches) such that when secured to the bumper/hand bar 48, via fasteners and fastening orifices 62, the leverage from the fastening orifices 62 and fastener to the opposing distal ends of the retention wings (relative to the length L) will provide stability to the taillight housing fixture 26 and prevent the taillight housing fixture 26 from pivoting, rocking or wobbling about the fasteners, or otherwise moving on the bumper/hand bar 48. Additionally, since the shape and contour of the retention wings 26B mates or matches with the shape and contour of an outer surface of the bumper/hand bar 48, the contact surface area between the retention wings 26B and the outer surface of the bumper/hand bar 48 is maximized (e.g., 80% to 100% contact surface area is provided between the retention wings 26B and the outer surface of the bumper/hand bar 48). In a non-limiting example, the retention wings 26B are engaged with at least portions of the inboard side, the outboard side, and a forward side of the bumper/hand bar 48. This maximized contact surface further provides stability to the taillight housing fixture 26 on the bumper/hand bar 48 and prevents pivoting or rocking about the fasteners, or otherwise moving on the bumper/hand bar 48.

The bumper/hand bar 48 is structured to have opposing side rails 48A that extend longitudinally along the tunnel side panels 18B that mount to the chassis 30 and to which the tunnel side panels 18 are attached, thereby providing structural reinforcement, rigidity, strength and stability to the tunnel 18. The bumper/hand bar 48 additionally includes a rear crossbar 48B extending from and between rearward distal ends of the side rails 48A rearwardly beyond the rearward end of the tunnel 18. In various embodiments, a rearward end portion of the side rails 48A are bent upward at an angle (e.g., a 10° to 90° angle) such that the crossbar 48B is disposed rearwardly beyond the rearward end of the tunnel 18 and above a plane of the tunnel main panel 18A. More specifically, the length of the side bars 48A are designed so that the rear crossbar 48B is disposed beyond and above the rearward distal end of the tunnel 18 such that a gap or space is provided between the rearward distal end of the tunnel 18 and the crossbar 48B. The taillight housing fixture 26 can be disposed and mounted to the tunnel 18 and to the bumper/hand bar side rails 48A within the gap or space.

In such embodiments, the retention wings 26B can be disposed on the angled upward portion of the side bars 48A and the taillight housing fixture 26 can be mounted to the angled upward portion of the side bars 48A, via the wing fastening orifices 62, such that a bottom surface of a leading edge portion 26A3 of the taillight housing fixture main body 26A is substantially coplanar and flush with the plane of the tunnel main panel 18A. As exemplarily shown in FIGS. 12 and 13, the leading edge portion 26A3 can be positioned along the tunnel 18 at or forward of where a straight section of the bumper/hand bar side rails 48A begins to curve upward towards the bumper/hand crossbar 48B. In various embodiments, the taillight housing leading edge portion 26A includes one or more attachment orifice 66 that are structured and operable to have a fastener (e.g., screw, rivet, bolt, expanding push fastener, etc.) inserted therethrough to attach and secure the taillight housing fixture 26 to the rearward distal end portion of the tunnel 18, thereby providing structural reinforcement, rigidity, strength and stability to the tunnel 18. In a non-limiting example, the taillight housing fixture 26 is removably fastened to the tunnel main panel 18A. In various instances, the fastener (e.g., screw, rivet, bolt, expanding push fastener, etc.) inserted through attachment orifice 66 to attach and secure the taillight housing fixture 26 to the rearward distal end portion of the tunnel 18 can further secure at least a portion of the heat exchanger 24 (e.g., a rearward end of the heat exchanger 24) to an underside of the tunnel 18 as exemplarily illustrated in FIGS. 15 and 16.

As described above, the taillight housing fixture 26 can be fabricated of a light gauge stamped sheet metal, a fiber reinforced polymer, additive manufacturing, or any other suitable metal, polymer or plastic composite or compound. Additionally, in various embodiments, the taillight housing fixture 26 is constructed to be substantially sturdy, stout, rigid and not easily flexible such that when connected to the tunnel 18 and the bumper/hand bar 48 the taillight housing fixture 26 will provide structural reinforcement, rigidity, strength and stability to the tunnel 18, and will minimize, control or substantially prevent flexing, twisting and other movement of the tunnel 18. More particularly, as result of the bumper/hand bar 48 being connected to the chassis 30, the shape, contour and length of the taillight housing fixture retention wings 26B, the secure mounting of the taillight housing fixture 26 to the bumper/hand bar 48, and the sturdy construction of the taillight housing fixture 26, when connected to the rearward end of the tunnel 18 the taillight housing fixture 26 provides structural reinforcement, rigidity, strength and stability to the tunnel 18 whereby flexing, twisting and other movement of the tunnel 18 is minimized, controlled or substantially prevented. This, in turn, significantly reduces or prevents damage to the tunnel 18 and/or the heat exchanger 24 that can result from uncontrolled, or unrestrained flexing, twisting and other movement of the tunnel 18.

Figure 7:
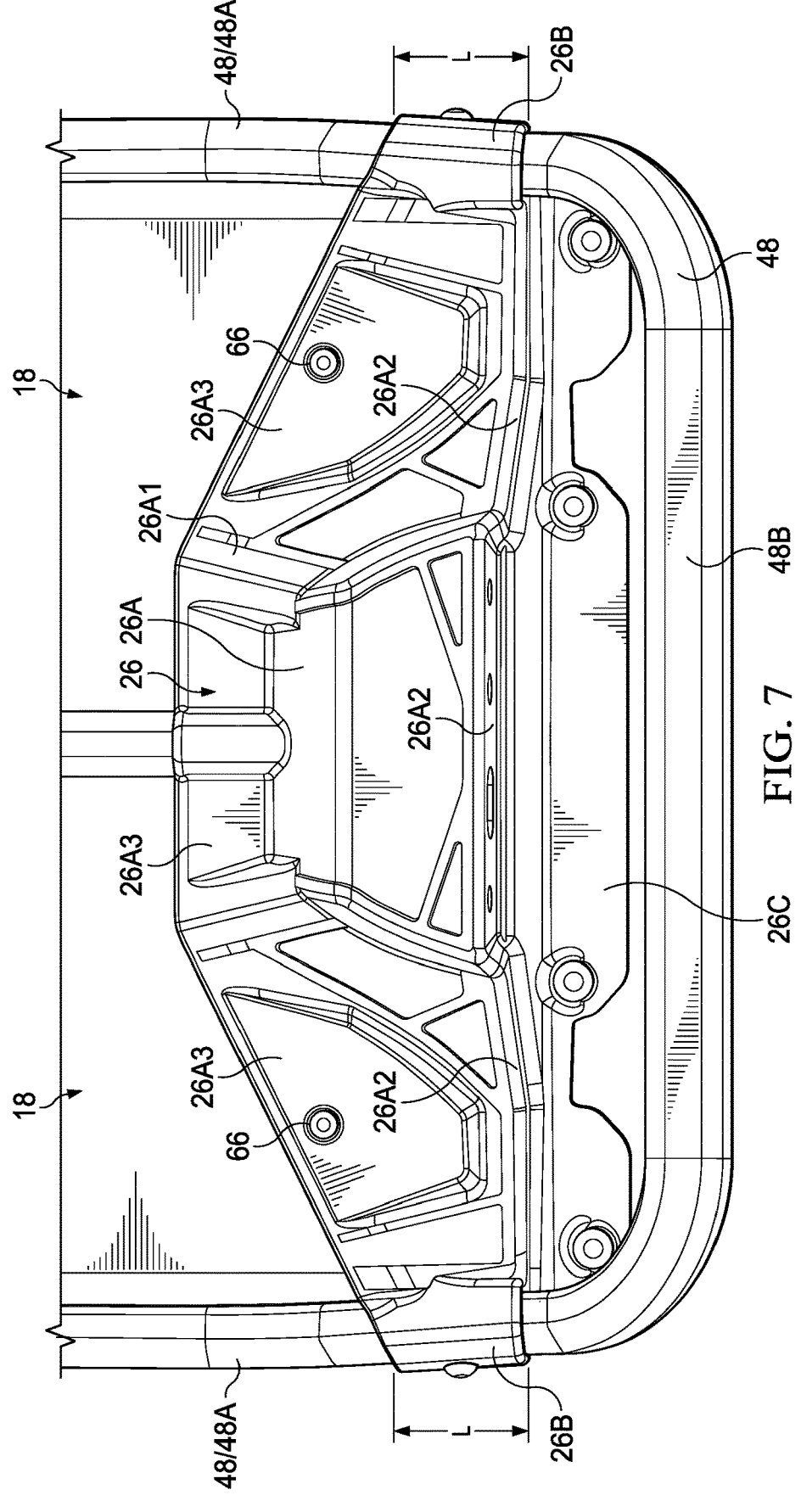
FIG. 7 is an exemplary top view of the taillight housing fixture shown in FIGS. 5 and 6 mounted to the tunnel and the bumper/hand bar in accordance with various embodiments of the present disclosure.

Referring now to FIGS. 8 through 13, the snow flap 28 generally comprises a mounting lip 28A, a main body 28B extending from the mounting lip 28A and a pair of opposing retention arms 28C extending from ends of opposing lateral sidewalls 78 of the main body 28B. The snow flap 28 is attachable to the taillight housing fixture flap mounting tail 26C. In various embodiments, the flap mounting tail 26C includes a plurality of flap mounting holes 68, and the mounting lip 28A of the flap 28 includes a plurality of fastening orifices 70 that are disposed in the mounting lip 28A to align with the taillight housing fixture flap mounting holes 68 such that fasteners (e.g., rivets, screws, nuts and bolts, self-securing push fasteners, etc.) can be inserted therethrough to securely and optionally, removably, fasten the flap 28 to the taillight housing fixture 26. In a non-limiting example, the flap mounting tail 26C extends rearward and optionally downward from the rear end of the tunnel 18. Therefore, the snow flap 28 can be secured to the flap mounting tail 26C without being directly secured to the tunnel 18. As shown in FIG. 7, the flap mounting holes 68 in the flap mounting tail 26C are positioned rearward of the rear end of the tunnel 18 and forward of the bumper/hand crossbar. Accordingly, the flap mounting tail 26C may function as a selectively removable close-off for the rearward end of the tunnel 18.

The flap main body 28B comprises and upper portion 28BU extending from the mounting lip 28A and lower portion 28BL extending at an angle β from the upper portion 28BU, thereby defining an elbow or bend 28C in the main body 28B. The angle β can be any desired obtuse angle. For example, in various embodiments angle β can be an angle between 95° and 175°. Additionally, the main body 28B comprises a central panel 74 and the opposing lateral sidewalls 78 extending at an angle (e.g., generally orthogonally or any other desired angle) from opposing edges of the central panel 74. The central panel 74 and sidewalls 78 respectively have an upper portion 74U and 78U, and a lower portion 74L and 78L that respectively make up the main body upper and lower portions 28BU and 28BL.

The retention arms 28C extend from the opposing ends of the sidewalls 78, more specifically the retention arms 28C extend from the opposing ends of the sidewall upper portions 78U having a curved a C-like shape that is contoured and shaped to mate or match with the shape and contour of the outer surface of the bumper/hand bar 48 such that each retention arm 28C can be disposed over and snuggly or tightly fit over or mate with opposing side portions of the bumper/hand bar 48. Additionally, the retention arms 28C have a longitudinal length M and at least one fastening aperture 82. The length M of the retention arms 28C can be greater than the length L of the retention wings 26B. The fastening apertures(s) 82 is/are structured and operable to have a fastener (e.g., screw, rivet, bolt, expanding push fastener, etc.) inserted therethrough to attach and secure the snow flap 28 to the bumper/hand bar 48. The fastening aperture 82 can be positioned to insert the fastener into the rearward side of the bumper/hand bar 48. The fastener inserted through the fastening aperture 82 can be positioned along the bumper/hand bar 48 lower than the fastener inserted through the attachment orifice 62 of the retention wings 26B. The fastener inserted through the fastening aperture 82 can extend into the bumper/hand bar 48 in a direction that is perpendicular to the direction that the fastener inserted into the bumper/hand bar 48 extends through the attachment orifice 66 of the retention wings 26B.

The length M of the retention arms 28C is designed and structured to provide stability to snow flap 28 when the snow flap 28 is secured to the bumper/hand bar 48. More specifically, the length M of the retention arms 28C is designed and structured to have a length (e.g., 3, 4, 5, 6 or more inches) such that when secured to the bumper/hand bar 48, via fasteners and fastening apertures 82, the leverage from the fastening aperture 82 and fastener to the opposing distal ends of the retention arms 28C (relative to the length M) will provide stability to the snow flap 28 and prevent or inhibit the snow flap 28 from pivoting, rocking or wobbling about the fasteners, or otherwise moving on the bumper/hand bar 48. Additionally, since the shape and contour of the retention arms 28C mates or matches with the shape and contour of an outer surface of the bumper/hand bar 48, the contact surface area between the retention arms 28C and the outer surface of the bumper/hand bar 48 is maximized (e.g., 80% to 100% contact surface area is provided between the retention arms 28C and the outer surface of the bumper/hand bar 48). This maximized contact surface further provides stability to the snow flap 28 on the bumper/hand bar 48 and prevents pivoting or rocking about the fasteners, or otherwise moving on the bumper/hand bar 48. In various embodiments, the retention arms 28C engage bumper/hand bar 48 adjacent to and opposite the retention wings 26B of the taillight housing fixture 26.

Figure 9:
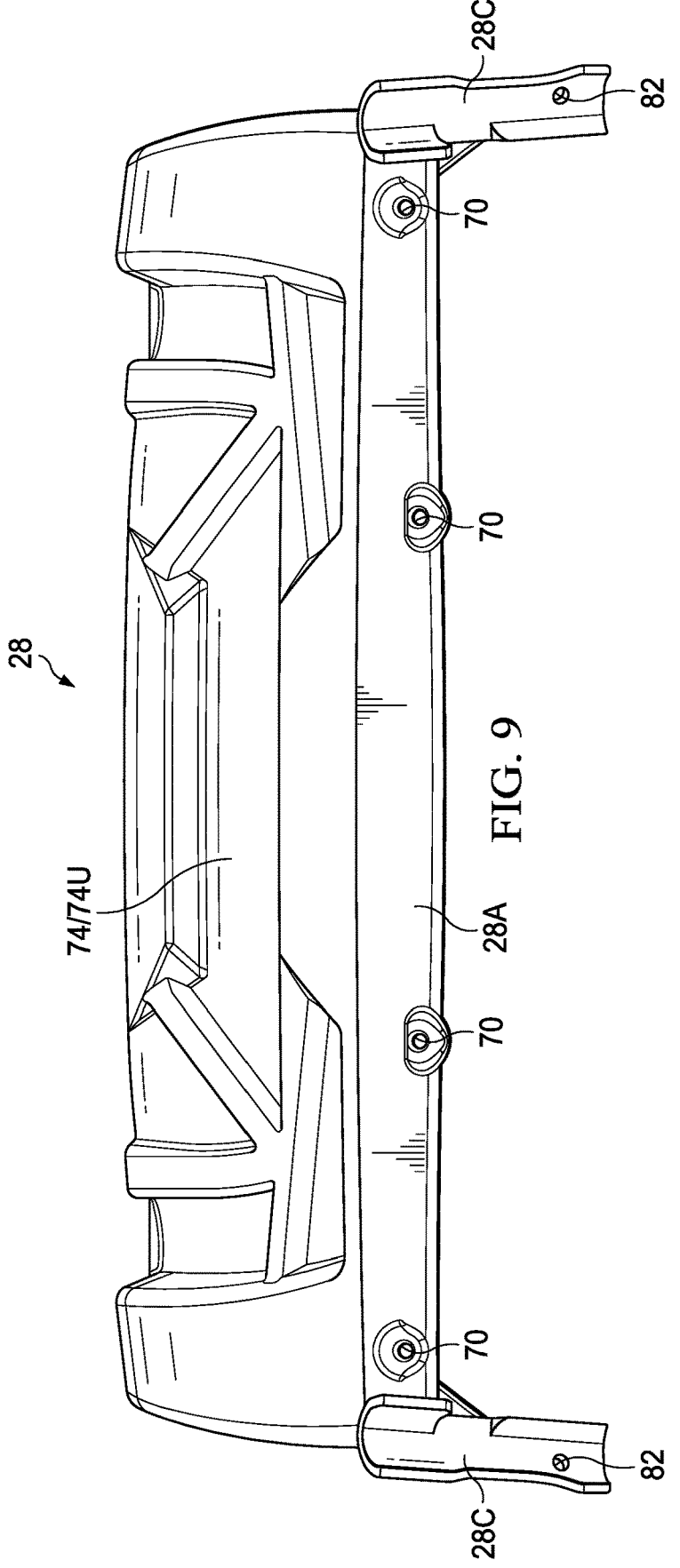
FIG. 9 is an exemplary top view of the snow flap shown in FIG. 8 in accordance with various embodiments of the present disclosure.
Figure 10:
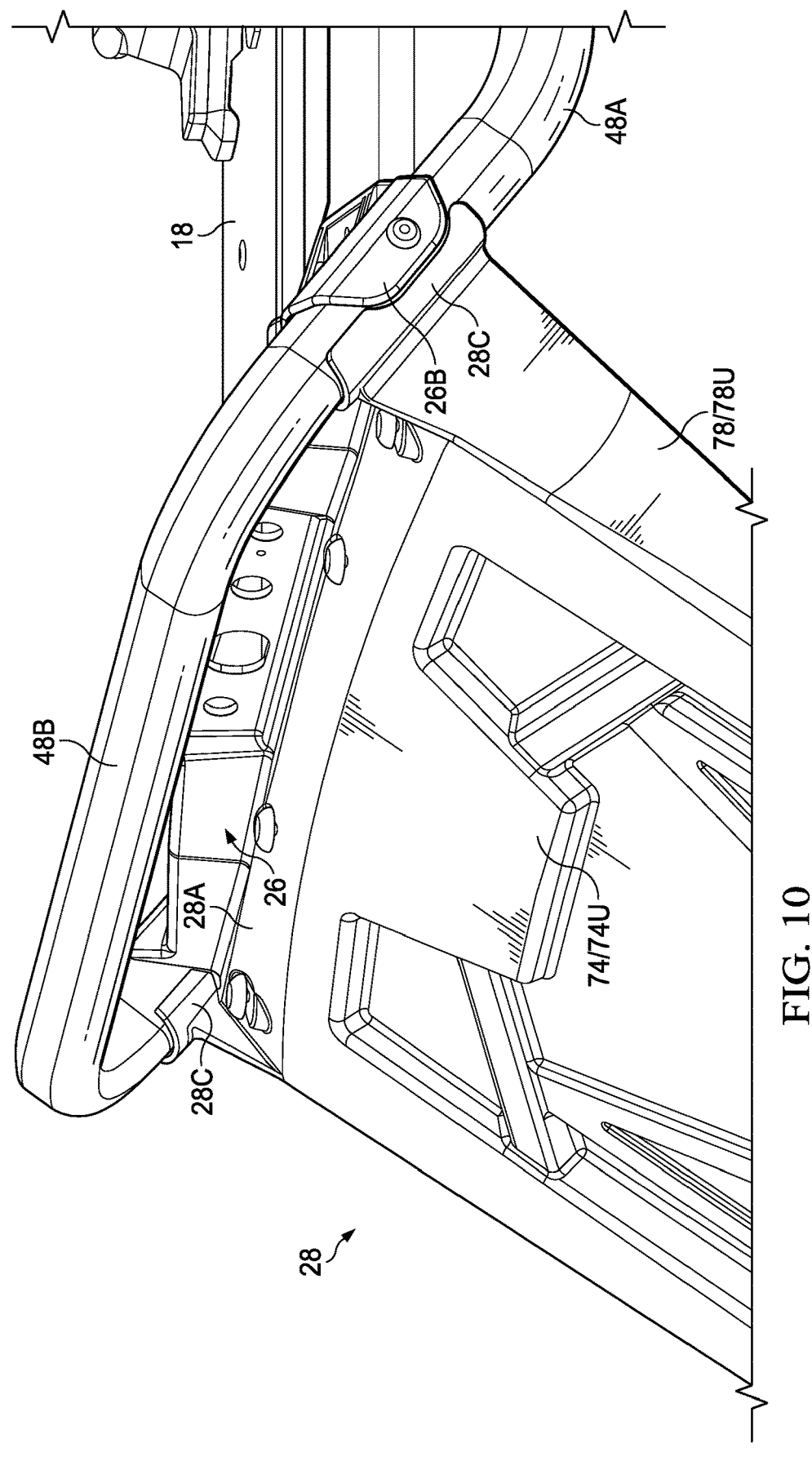
FIG. 10 is an exemplary isometric view of a portion of the taillight and snow flap assembly shown in FIGS. 1 and 2 mounted to the tunnel and the bumper/hand bar in accordance with various embodiments of the present disclosure.
Figure 13:
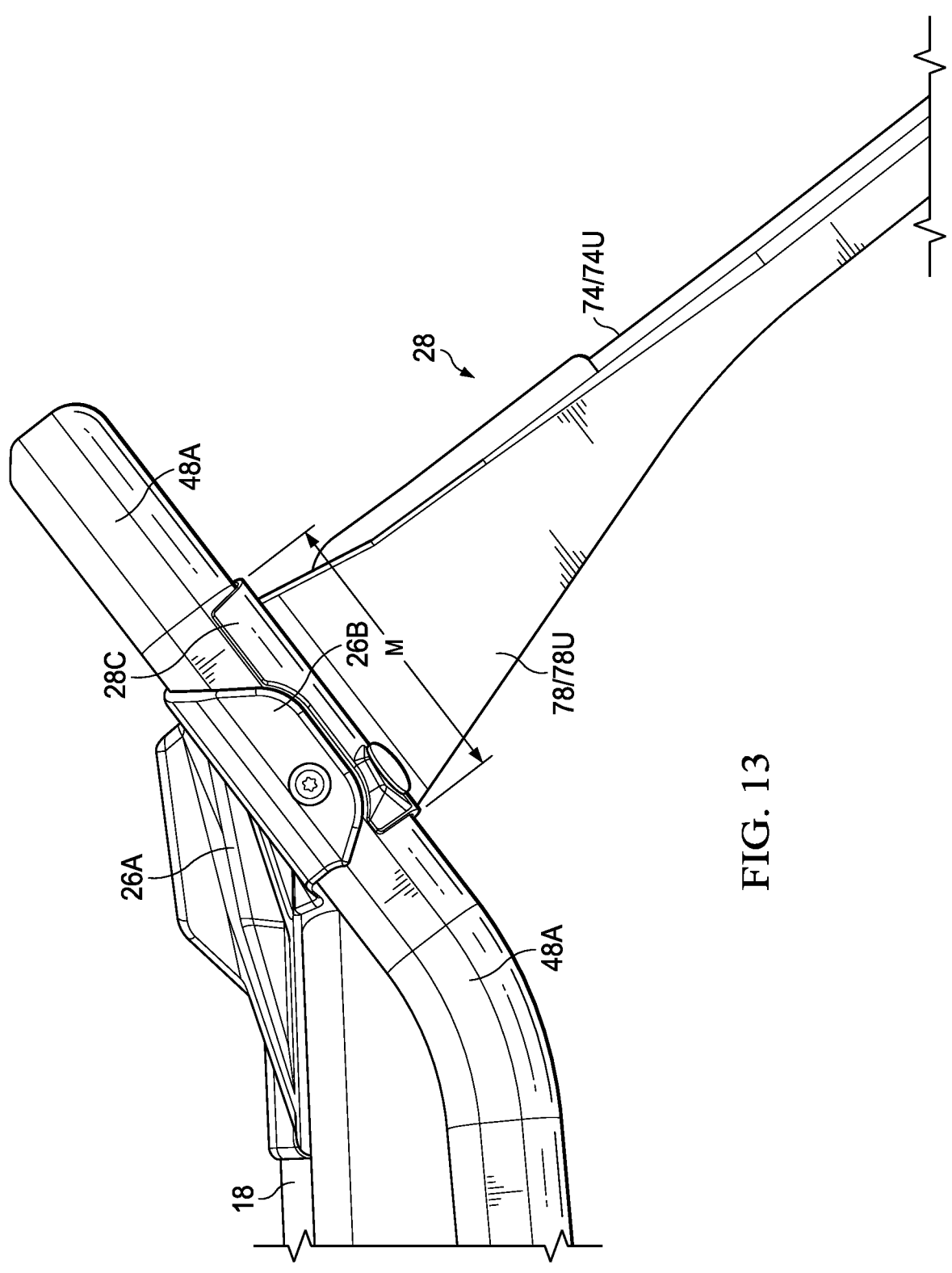
FIG. 13 is an exemplary side view close-up of a portion of the taillight and snow flap assembly shown in FIGS. 1 and 2 mounted to the tunnel and the bumper/hand bar in accordance with various embodiments of the present disclosure.
Figure 14:
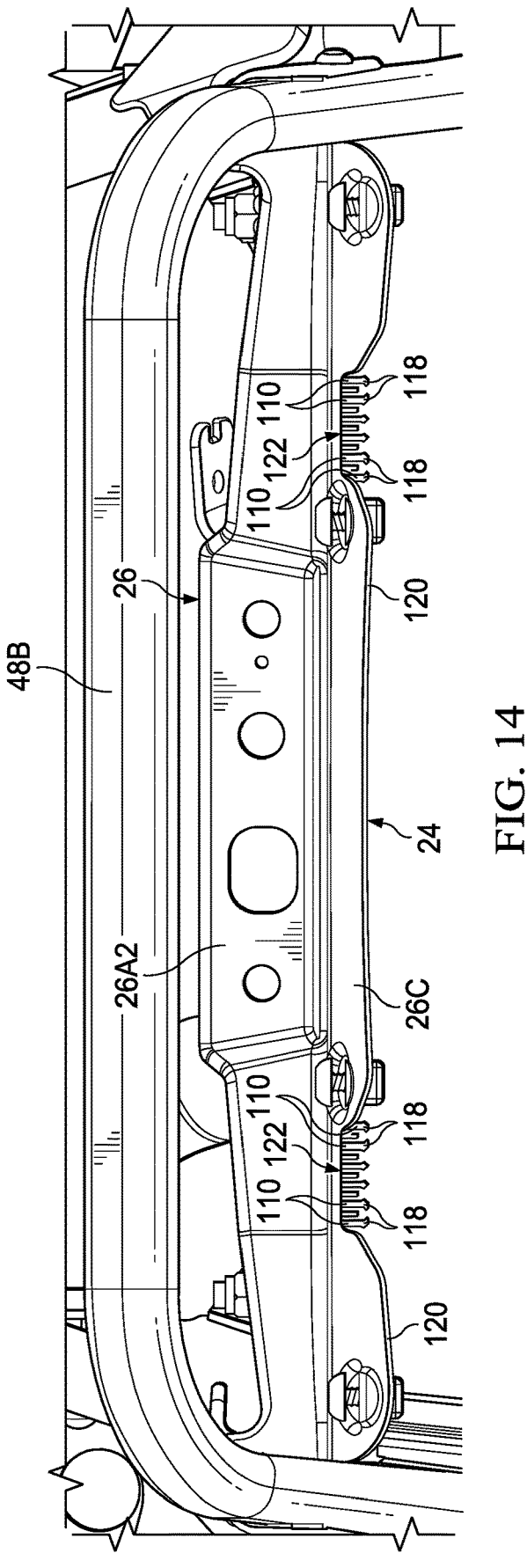
FIG. 14 is an exemplary rear view of the taillight housing fixture shown in FIGS. 1 through 7 comprising at least one heat exchanger shield access port, whereby one or more heat exchanger shield can be installed and removed from a heat exchanger of the snowmobile without removal of the taillight housing fixture in accordance with various embodiment so of the present disclosure.

In a non-limiting example, the retention arms 26C are engaged with at least portions of the inboard side, the outboard side, and a rearward side of the bumper/hand bar 48. As shown in FIGS. 9, 10, and 13, one or both of the inboard and the outboard sides of the retention arms 26C can be recessed to accommodate the shape of the retention wings 26B. In a non-limiting example, at least a portion of the retention wings 26B can be positioned in the recess of the inboard and outboard sides of the retention arms 26C. In a non-limiting example, positioning of the retention arms 26C on the outboard sides of the snow flap 28 and securing the snow flap 28 to the mounting tail 26C that is positioned below the rear end of the tunnel 18 allows the mounting lip 28A to have a substantially flat shape that conforms to the surface of the flap mounting tail 26C of the taillight housing fixture 26, thereby entirely positioning the mounting lip 28A and the main body 28B of the snow flap 28 below any light lens 54 and/or reflective lens 58 positioned on the rear lens face 26A2 of the taillight housing fixture 26. Therefore, the snow flap 28 provides an unobstructed view of any light lens 54 and/or reflective lens 58 positioned on the rear lens face 26A2, and maximizes hand clearance between the snow flap 28 and the bumper/hand crossbar 48B.

Figure 8:
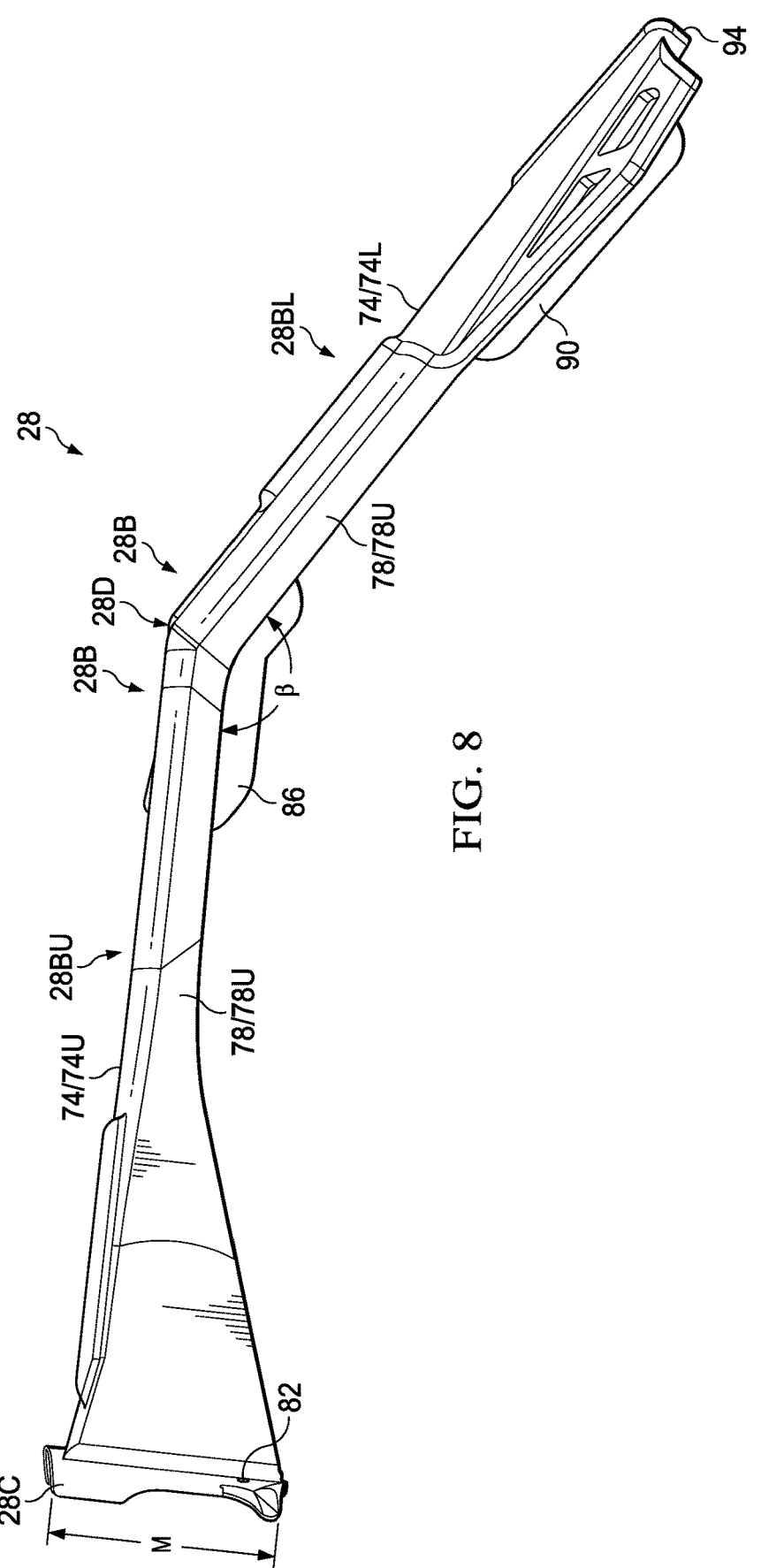
FIG. 8 is an exemplary side view of a snow flap of the taillight and snow flap assembly shown in FIGS. 1 and 2 in accordance with various embodiments of the present disclosure.
Figure 11:
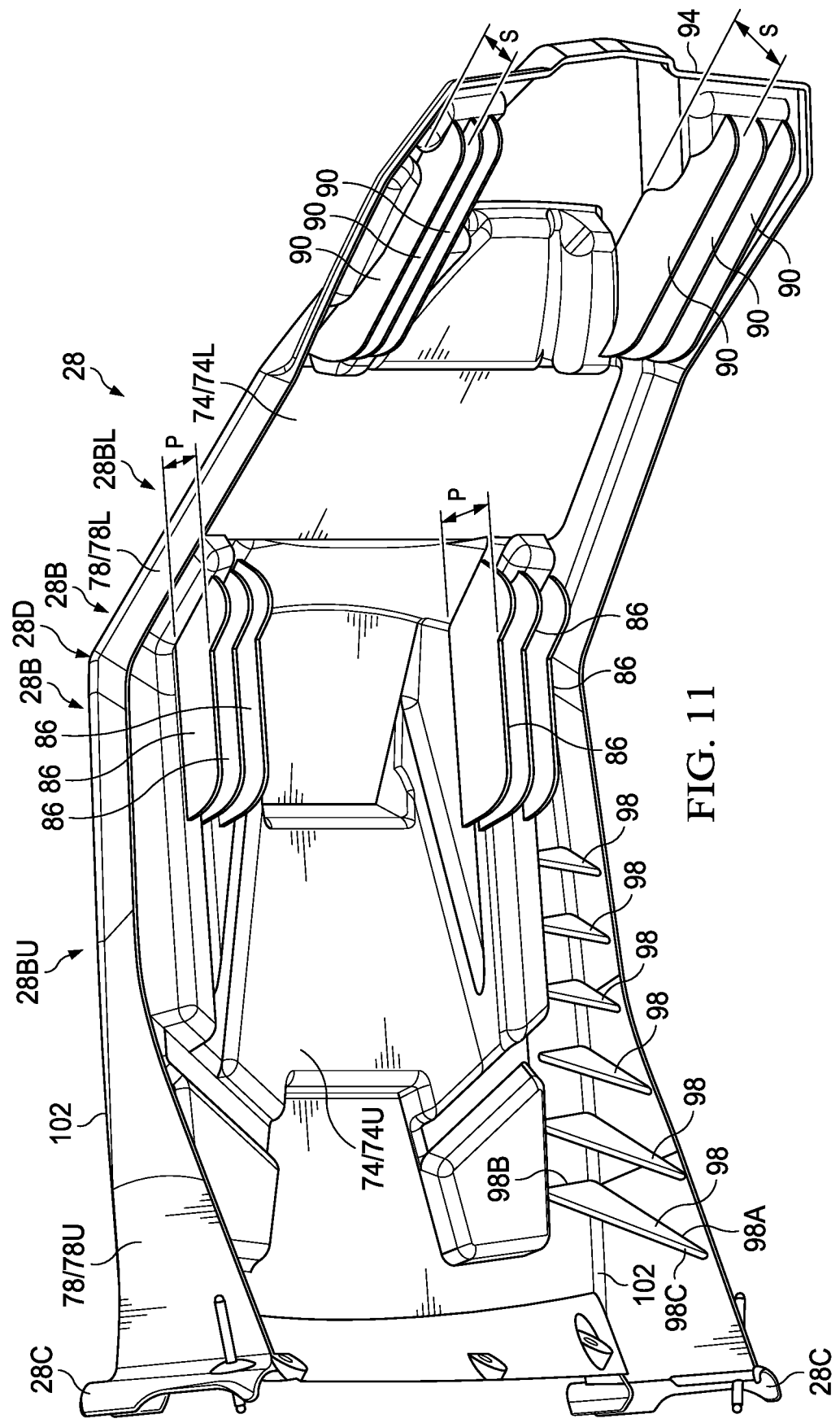
FIG. 11 is an exemplary isometric view of an underside of the snow flap shown in FIG. 10 in accordance with various embodiments of the present disclosure.
Figure 12:
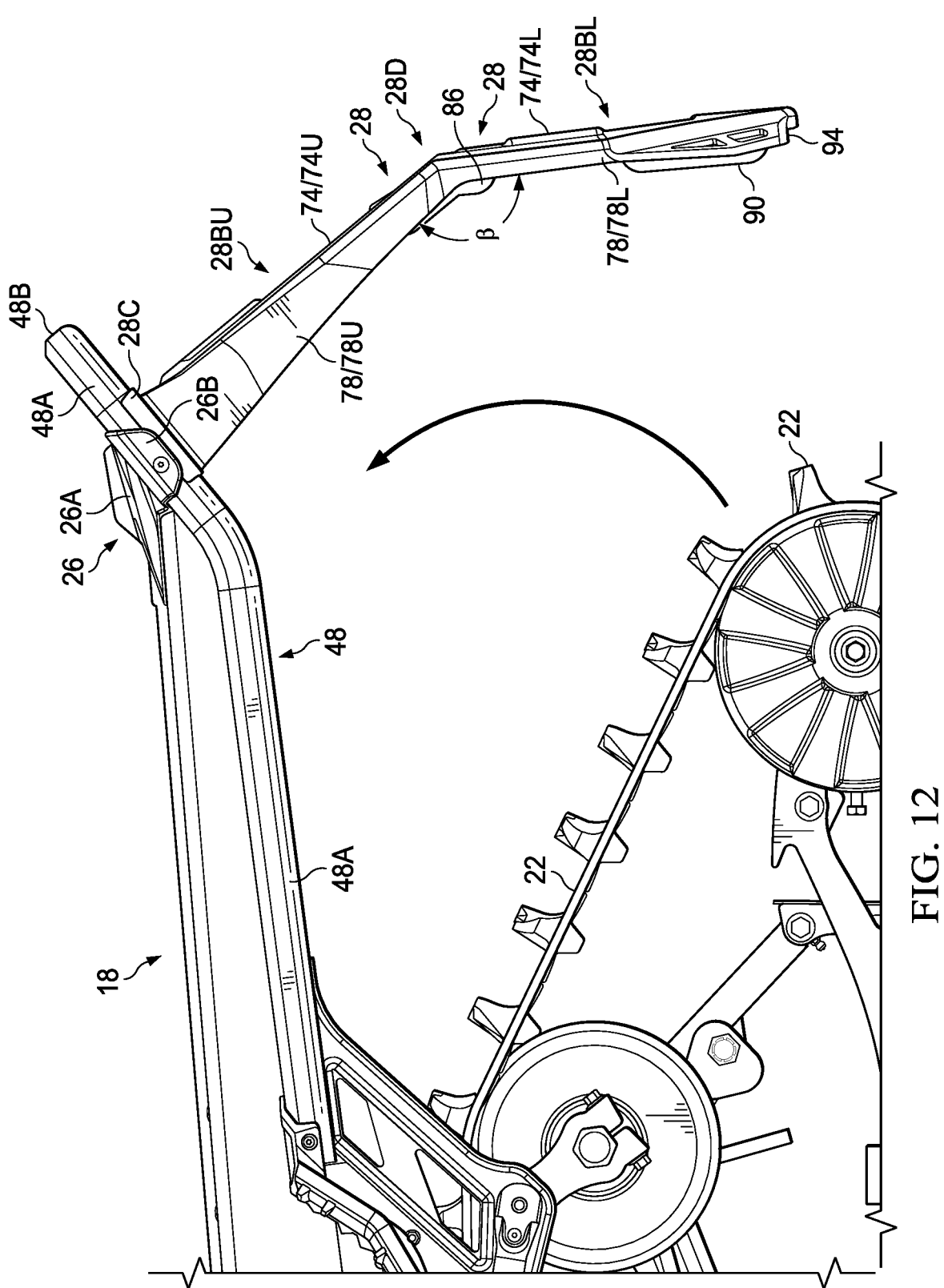
FIG. 12 is an exemplary side view of the taillight and snow flap assembly shown in FIGS. 1 and 2 mounted to the tunnel and the bumper/hand bar in accordance with various embodiments of the present disclosure.

Referring particularly to FIGS. 8, 11 and 12, in various embodiments, the snow flap 28 comprises a plurality of support and guide ribs 86 formed within the elbow 28D on an interior or underside of snow flap 28. The support and guide ribs 86 extend from the elbow 28D along a portion of the underside of main body upper portion 28BU and along a portion of the underside of main body lower portion 28BL. The support and guide ribs 86 are formed within the elbow 28D and spaced apart along the entire width, or one or more section of the width, of the interior side of the snow flap 28. In various embodiments, the support and guide ribs 86 can be evenly spaced apart along the entire width, or one or more section of the width, of the interior side of the snow flap 28, while in other embodiments the support and guide ribs 86 can be unevenly spaced apart along the entire width, or one or more section of the width, of the interior side of the snow flap 28. In various embodiments, the support and guide ribs 86 can formed and spaced along the entire width of the interior side of the snow flap 28, while in other embodiments the support and guide ribs 86 can be formed in one or more group disposed along one or more portion or section of the width of the interior side of the snow flap 28. Furthermore, in various embodiments the support and guide ribs 86 can have a consistent height P along their entire length, while in other embodiments the height P of the support and guide ribs 86 can increase and/or decrease, vary or undulate along their length. In various embodiments, the height(s) of P can be the same for each support and guide rib 86 (e.g., all support and guide ribs 86 have the same size, form, geometry and profile), while in other embodiments one or more of the supports and guide ribs 86 can have a size, form, geometry and/or profile than at least one other support and guide rib 86.

The support and guide ribs 86 are structured and operable to provide structural support of the snow flap 28 along the elbow 28D such that the snow flap 28 is inhibited from bending or collapsing along the elbow 28D, and more particularly along the length of the support and guide ribs 86. More particularly, if the snow flap 28 is impacted (e.g., the distal end of the main body lower portion 28BL contacts/impacts the ground/snow), the structure and guide ribs 86 can prevent bending of the snow flap at the elbow 28D and directs or cause any bending or flexing of the snow flap 28 to occur at or within the portion of the main body lower portion 28BL extending below the structure and guide ribs 86. The support and guide ribs 86 are further structured and operable to direct snow thrown up by the drive track 22 along the flap main body central panel upper portion 74U onto the underside of the tunnel 18, and more particularly onto the heat exchanger 24, to thereby improve the cooling efficiently of the heat exchanger 24.

In various embodiments, the snow flap 28 can additionally include a plurality of anti-hooking ribs 90 formed on the interior or underside of snow flap 28 along a distal end section of the main body lower portion 28BL. The anti-hooking ribs 86 extend from or near a distal end 94 of the main body lower portion 28BL (also the distal end of the lower snow flap 28) upward toward the elbow 28D and can have any desired length relative to a distance between the distal end 94 and the support and guide ribs 86. The anti-hooking ribs 90 can be spaced apart along the entire width, or one or more section of the width, of the distal end section of the main body lower portion 28BL. In various embodiments, the anti-hooking ribs 90 can be evenly spaced apart along the entire width, or one or more section of the width, of the main body lower portion 28BL, while in other embodiments the anti-hooking ribs 90 can be unevenly spaced apart along the entire width, or one or more section of the width, of the main body lower portion 28BL. In various embodiments, the anti-hooking ribs 90 can be formed and spaced along the entire width of the main body lower portion 28BL, while in other embodiments the anti-hooking ribs 90 can be formed in one or more group disposed along one or more portion or section of width of the main body lower portion 28BL. Furthermore, in various embodiments anti-hooking ribs 90 have a consistent height S along their entire length, while in other embodiments the height S of the anti-hooking ribs 90 can increase and/or decrease, vary or undulate along their length. In various embodiments, the height(s) of S can be the same for each anti-hooking rib 90 (e.g., all anti-hooking ribs 90 have the same size, form, geometry and profile), while in other embodiments one or more of the anti-hooking ribs 90 has a size, form, geometry and/or profile than at least one other anti-hooking rib 90.

The anti-hooking ribs 90 are structured and operable to prevent the drive track 22 (e.g., the paddle and/or studs/ spikes of the drive track 22) from hooking or catching on the lower distal end 94 of snow flap 28. Particularly, the height S of the anti-hooking ribs 92 is such the anti-hooking ribs protrude or extend from the underside of the main body lower portion 28BL a sufficient distance whereby, if operation of the snowmobile 10 causes the drive track 22 to contact the snow flap 28, or the snow flap 28 to contact the drive track 22, the anti-hooking ribs, the drive track paddles and/or studs/spikes will contact the anti-hooking ribs 90, and not hook or catch the lower distal end 94 of the snow flap 28. Particularly, the anti-hooking ribs 90 are disposed longitudinally along the underside of the main body lower portion 28BL, and shaped and have a length such that the paddles and/or studs/spikes of the drive track 22 cannot catch or hook on the anti-hooking ribs 90, but rather will simple contact and slide or advance along the anti-hooking ribs 90 elongated top edges, thereby preventing the drive track paddles and/or studs/spikes from hooking or catching snow flap distal end 94, and thereby preventing damage to the snow flap 28 and/or the drive track 22.

Referring particularly to FIG. 11, is still further embodiments, the snow flap 28 can comprise a plurality of reinforcement braces 98 formed along an interior side of a longitudinal corners 102 formed at the junction of the main body central panel upper portion 74U and each of the sidewall upper portion 78U of the snow flap main body upper portion 28BU. Although FIG. 11 only exemplarily illustrates the reinforcement braces 98 disposed only the interior of one of the opposing longitudinal corners 102, it should be readily understood that the interior of both of the longitudinal corners 102 comprise the reinforcement braces 98 described herein. Each reinforcement brace 98 includes a first side 98A connected to or integrally formed with the sidewall upper portion 78U and a second side 98B connected to or integrally formed with the main body central panel upper portion 74U. A third side 98C of each reinforcement brace 98 extending between the first and second sides 98A and 98B can have any desired shape or profile. The reinforcement braces 98 are structured and operable to prevent the sidewall upper portion 78U from folding, bending, collapsing or concaving interiorly inward into the main body central panel upper portion 74U. Additionally, the reinforcement braces help the snow flap 28 keep its shape while allowing it to bend and flex.

Referring now to FIGS. 14 through 19, as described above the snowmobile 10 comprises the heat exchanger 24 that is disposed on the underside of the tunnel 18. More particularly, the heat exchanger 24 is disposed on the underside of the tunnel main panel 18A. Generally, the heat exchanger 24 comprises a main body 112 having internal fluid channels (not shown) through which a prime mover cooling fluid circulates and a plurality of cooling fins 116 extending and protruding from a face of the heat exchanger body 112. The heat exchanger 24, particularly the internal fluid channels, are is/are fluidly connected to the prime mover 34 (e.g., an internal combustion engine (ICE) an electric motor and/or an electric motor component) and is structured and operable to have the prime mover cooling fluid flowing from the prime mover 34 circulate through the heat exchanger internal fluid channels and return to the prime mover 34, thereby cooling the prime mover 34.

Specifically, as hot cooling fluid from the prime mover 34 circulates through the heat exchanger 24 internal fluid channels heat from the hot cooling fluid is absorbed by the heat exchanger 24 and the cool/cold exterior environment (e.g., air, water and/or snow) surrounding the heat exchanger 24, thereby cooling the cooling fluid. The cooled cooling fluid is then returned to the prime mover 34, thereby cooling the prime mover 34. The cooling fins 116 increase the surface area for the thermal exchange between the hot cooling fluid and the cool/cold exterior environment. The heat exchanger main body 24 can have any desired and suitable shape, size and geometry to be mountable to the underside of the tunnel 18. For example, as exemplarily and non-limitingly illustrated in the various figures, in various embodiments the heat exchanger main body 112 can be configured to comprise a pair of longitudinal legs 112A a lateral bridge section that joins the longitudinal legs 112A (physically and fluidly) to each other, (e.g., at a rearward distal end, or elsewhere along the length of the longitudinal legs 112A). Alternatively, the main body 112 can be one singular structure (e.g., rectangular, square, oval, etc.), or can have a plurality of lateral bridge sections 112B that join the longitudinal legs 112A (physically and fluidly) to each other at various points along the length of the longitudinal legs 112A, or can have three or more longitudinal legs 112A with one or more lateral bridge sections 112B.

Figure 15:
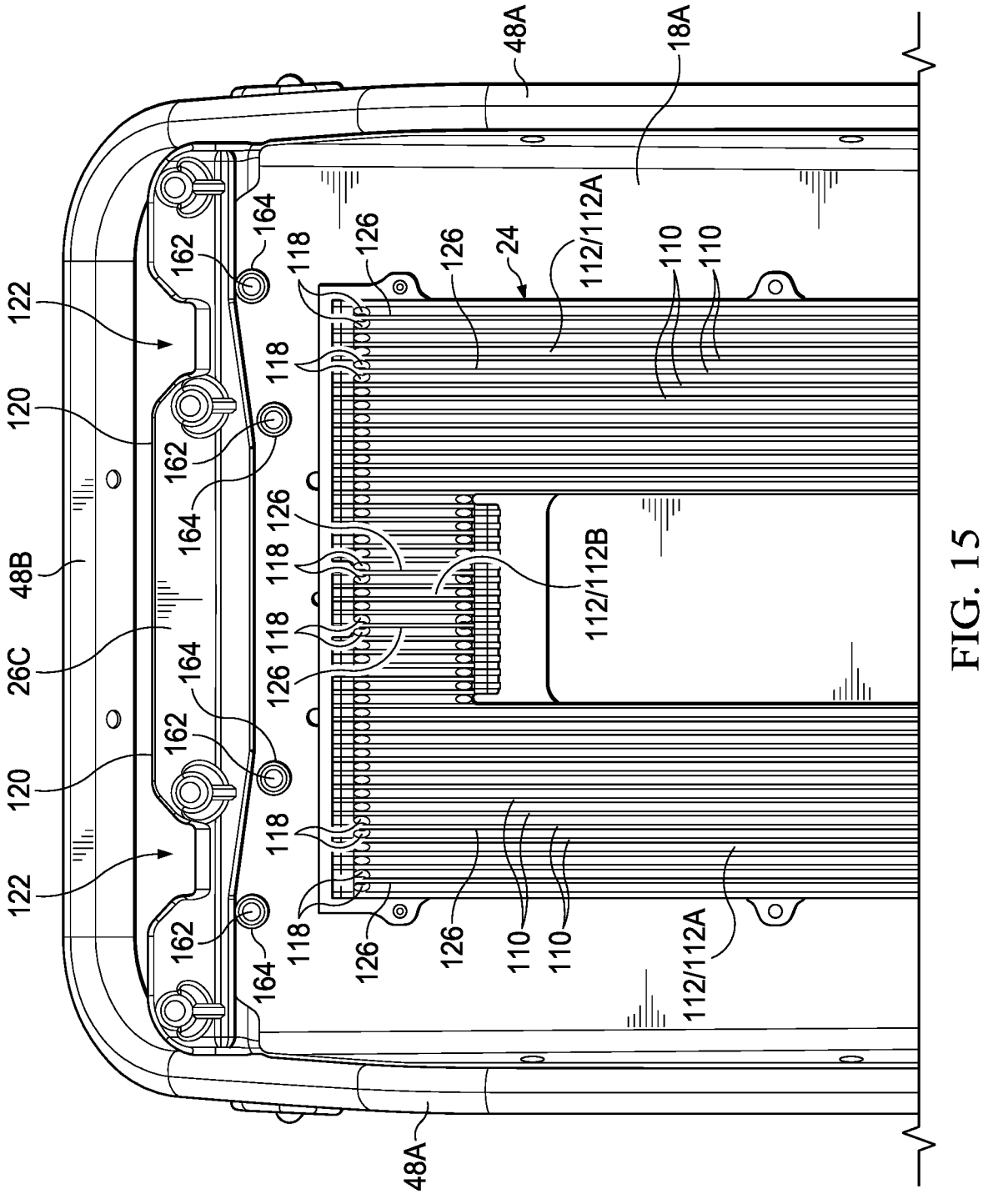
FIG. 15 is an exemplary view of an underside of the snowmobile tunnel having the heat exchanger mounted thereto, and of the taillight housing fixture shown in FIG. 14 having the heat exchanger shield access port(s) in accordance with various embodiment so of the present disclosure.
Figure 16:
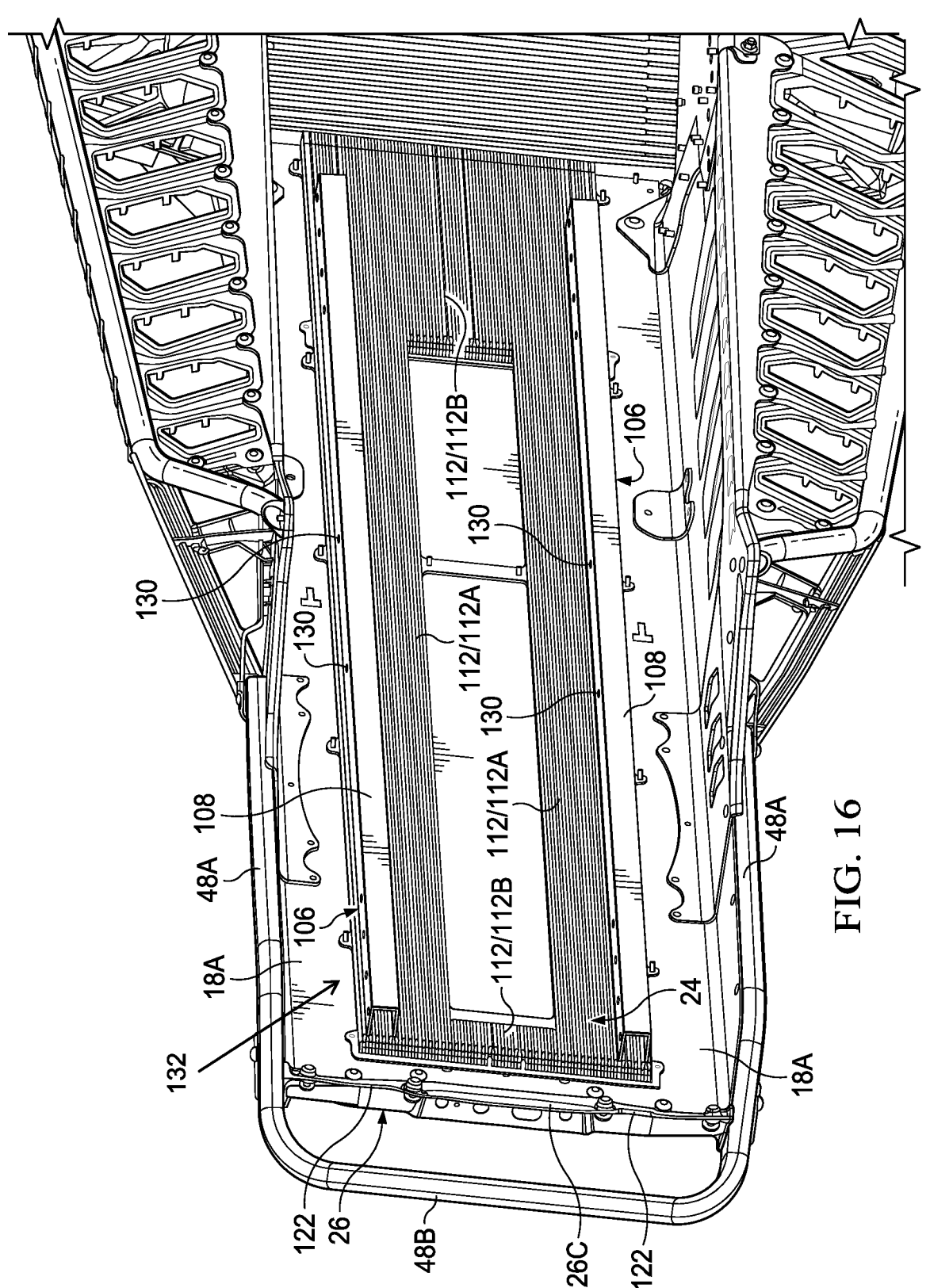
FIG. 16 is an exemplary isometric view of the underside of the snowmobile tunnel and taillight housing fixture shown in FIG. 15 in accordance with various embodiment so of the present disclosure.
Figure 17:
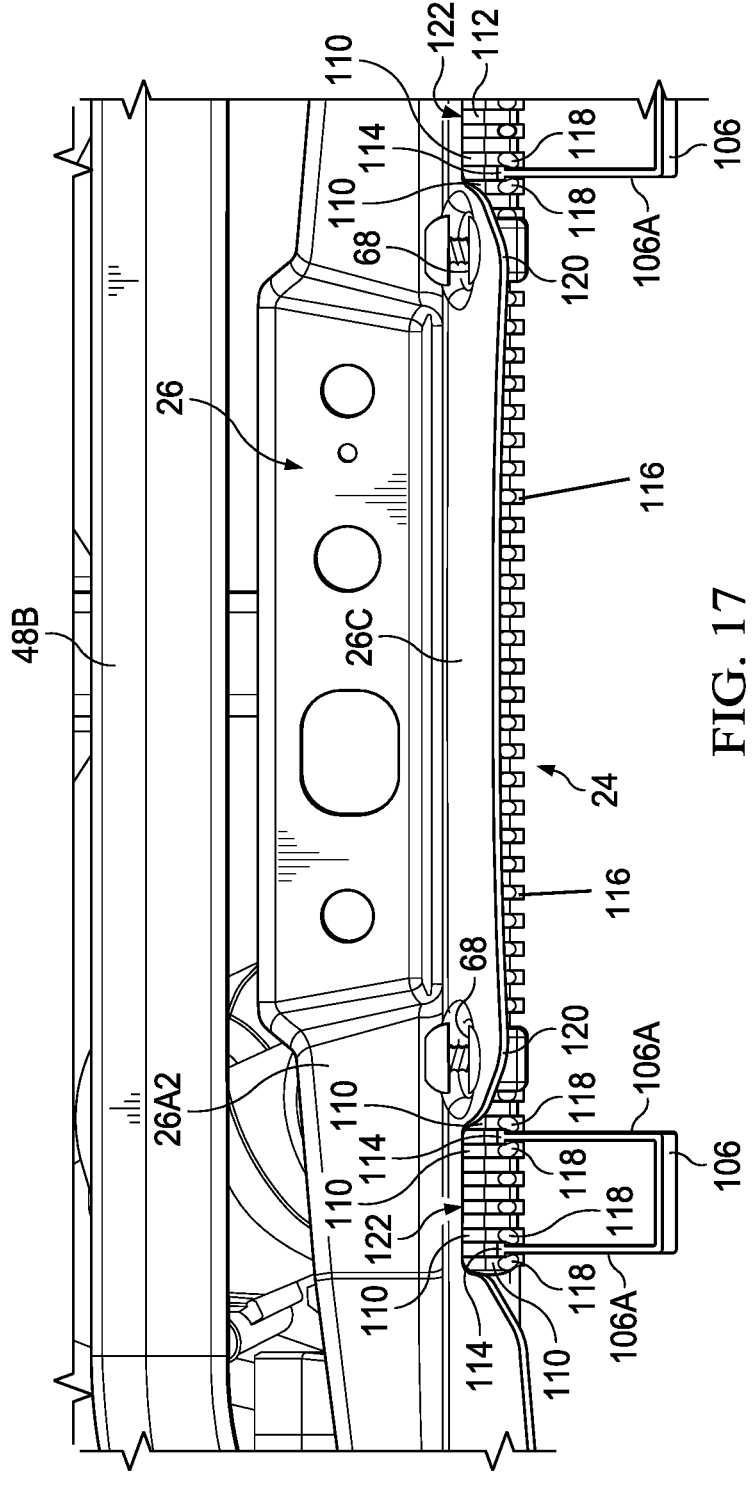
FIG. 17 is an exemplary close-up rear view of the taillight housing fixture shown in FIGS. 14, 15 and 16 exemplarily illustrating how the heat exchanger shield access port(s) allow for easy installation and removal of the heat exchanger shields without removal of the taillight housing fixture in accordance with various embodiment so of the present disclosure.

It should be noted that the heat exchanger 24 as shown in FIGS. 15 and 16 are only exemplary illustrations of exemplary configurations, shapes, and sized of the heat exchanger 24 and are not limiting. The heat exchanger 24 as described and exemplarily illustrated herein can have any desired configuration and shape (e.g., with or without an opening in the center portion thereof) and size (e.g., have different lengths and widths such that heat exchanger 24 can cover any desired portion (e.g., length and width) of the underside of the tunnel 18.

In various embodiments, the snowmobile 10 includes one or more removable heat exchanger shield or guard 106 that is/are structured and operable to protect the heat exchanger 24 from being struck or contacted by the drive track 22 (e.g., the drive track paddles and/or studs/spikes) causing damage to the heat exchanger 24, the tunnel 18 and/or the snow flap 28. The heat exchanger 24 combined with the heat exchanger shield 106 (or combined with the heat exchanger shield assembly 134 (described below)) will be referred to herein as the heat exchanger and shield assembly 132. In various embodiments, the heat exchanger shield(s) 106 can be elongated U-shaped-like channel structures that are structured and operable to slidingly engage with, and be retained by, exchanger shield retention guides 110 formed on and protruding from a main body 112 of the heat exchanger 24 one or more locations across a width of the heat exchanger 24. More particularly, in various instances the heat exchanger 24 comprises a plurality of fins 116 formed on and protruding from a main body 112 of the heat exchanger 24, and the exchanger shield retention guides 110 comprise various pairs of the fins 116 modified as described below to retain the heat exchanger shield(s) 106 and disposed at one or more location across the width of the heat exchanger 24. For example, in various embodiments the heat exchanger 24 can comprise one pair of shield retention guides 110 disposed anywhere across the width of the heat exchanger 24, while in other embodiments, the heat exchanger 24 can comprise two pairs of shield retention guides 110 disposed at two locations across the width of the heat exchanger 24, while in yet other embodiments, the heat exchanger 24 can comprise three or more pairs of shield retention guides 110 disposed at three or more locations across the width of the heat exchanger 24. For example, with reference to FIG. 16, in various embodiment, the heat exchanger 24 can comprise a third pair of shield retention guides 110 disposed in the middle of the width of the heat exchanger 24 and on both sides of the opening in the exemplary heat exchanger 24 of FIG. 16 such that a corresponding third heat exchanger shield 106 slidingly disposed within the retention guides 110 will extend across the opening in the heat exchanger 24.

Each heat exchanger shield 106 generally comprises an elongated body 108 having a pair of opposing legs 106A. In various embodiments, the legs 106A of the heat exchanger shield(s) 106 can have first engagement structures 114 formed on distal ends thereof. In various embodiments, the first engagement structures 114 can be nodules, feet or any other suitable engagement structure or member formed on distal ends of the heat exchanger shield legs 106A. Additionally, distal ends of the exchanger shield retention guides 110 can have second engagement structures 118 formed thereon. In various instances the second engagement structures 118 can be retention fingers or lips that angle inward toward the space between adjacent shield retention guides 110. The first engagement structures 114 are slidingly engageable with the second engagement structures 118 to secure the heat exchanger shield(s) 106 to the heat exchanger 24.

More specifically, the shield leg first engagement structures 114 can be inserted between the exchanger shield retention guides 110 such that the second engagement structures 118 retain the first engagement structures 114 between adjacent shield retention guides 110. Particularly, the exchanger shield legs 106A can be inserted between adjacent exchanger shield retention guides 110 and the heat exchanger shield(s) 106 can be slid within the exchanger shield retention guides 110 along the length of the heat exchanger 24, whereby the first engagement structures 114 (e.g., nodules or feet) slidingly engage the exchanger shield retention guide second engagement structures 118 (e.g., fingers or lips) and retain the heat exchanger shield(s) 106 in place on the heat exchanger 24. Although shown as integral with the shield 106, it is to be understood that the first engagement structures 114 can be a separate component. In an illustrative example, the first engagement structure 114 is a separate component that is slidingly engaged with the heat exchanger 24, and the heat exchanger shield 106 can then be connected or otherwise secured to the first engagement structures 114 with one or more fasteners or other materials such as adhesives.

As describe above, the taillight housing fixture 26 is mounted to the bumper/hand bar 48 and to the rearward distal end of the tunnel 18. Such a structural taillight housing fixture 26 eliminates the need for additional reinforcements inside the tunnel 18 at the rearward end that at least partially cover or conceal a rearward distal end of the heat exchanger 24 when viewed from the rear of the tunnel 18 such that access from the rear end of the tunnel 18 to the heat exchanger retention guides 110 can be impeded or impaired due to the length of the heat exchanger shields 106 being greater than the distance between the rearward end of the heat exchanger 24 and the rearward end of the tunnel main panel 18A. However, in various embodiments, the taillight housing fixture 26 can extend downward and rearward from the tunnel main panel 18A and can further comprise one or more heat exchanger shield access ports or windows 122 formed in a trailing edge 120 of the taillight housing flap mounting tail 26C (i.e., a trailing edge of the taillight housing fixture 26). The heat exchanger shield access port(s) 122 are structured and operable to allow access to the exchanger shield retention guides 110 of heat exchanger 24 such that the heat exchanger shield(s) 106 can be installed and removed without removing the taillight housing fixture 26. In various embodiments, the heat exchanger shield access port(s) 122 can be one or more elongated notch or recess formed in the trailing edge 120 of the taillight housing flap mounting tail 26C. Alternatively, the heat exchanger shield access port(s) 122 can be one or more hole, aperture, cutout, or void in the taillight housing flap mounting tail 26C that is structured and operable to allow easy access to the exchanger shield retention guides 110 of heat exchanger 24.

More specifically, the heat exchanger shield access port(s) 122 provide access to one or more section of the rearward distal end of the heat exchanger 24, and more particularly to the exchanger shield retention guides 110, without removing or unmounting the taillight housing fixture 26 from either of the bumper/hand bar 48 and the tunnel 18. Hence, the heat exchanger shield access port(s) 122 allow access to the exchanger shield retention guides such that the heat exchanger shield(s) 106 to be installed and removed from the heat exchanger 24 (i.e., easily slidingly inserted into and withdrawn from exchanger shield retention guides 110 via access ports 122) without unmounting the taillight housing fixture 26 from one or both the bumper/hand bar 48 and the tunnel 18.

As described above, the snow flap 28 is mounted to the taillight housing fixture 26 via the flap mounting holes 68 in the flap mounting tail 26C of the taillight housing fixture 26 and the fastening orifices 70 in the mounting lip 28A of the flap 28. When the snow flap 28 is mounted to the taillight housing fixture 26, the heat exchanger shield access port(s) 122 in the taillight housing fixture 26 are covered, concealed and inaccessible. Hence, in order to install and/or remove the heat exchanger shield(s) 106 on and/or from the heat exchanger 24 only the fasteners fastening the snow flap 28 to the taillight housing fixture 26 and to the bumper/hand bar 48 need to be removed, whereafter the snow flap 28 can be removed to provide access to the heat exchanger shield access port(s) 122, access to the heat exchanger shield(s) 106 and/or the exchanger shield retention guides 106 of the heat exchanger 24.

Referring now to FIGS. 14 through 19, as described above, in various embodiments, the heat exchanger 24 can include one or more removable elongated U-shaped-like heat exchanger shield 106 that is/are structured and operable to protect the heat exchanger 24 from being struck or contacted by the drive track 22 (e.g., the drive track paddles and/or studs/spikes) causing damage to the heat exchanger 24. Each exchanger shield 24 comprises an elongated body 108 having a pair of opposing legs 106A that have the first engagement structures 114 formed at their distal ends. The exchanger shield(s) 24 can have any desired U-shaped-like cross-sectional shape. For example, in various instances the exchanger shield(s) 24 can have a cross-member 106B formed between and connecting the legs 106A such that the exchanger shield(s) 24 have a square or rectangular U-shaped-like cross-sectional shape. While in other instances the legs 106A can connect to each other or be an extension of each other such that the exchanger shield(s) 24 have a triangular, oval or circular U-shaped-like cross-sectional shape. As described above, each shield leg 106A has a first engagement structure 114 (e.g., a nodule, a foot or any other suitable retention structure) formed on distal ends thereof that are structured and operable to engage and retain the heat exchanger shield(s) 106 with and on the heat exchanger 24. The shield leg first engagement structures 114 can have any desired cross-sectional shape suitable to retain the heat shield legs 106A within a respective one of a plurality of shield retention channels 126 formed between and defined by the exchanger shield retention guides 110 of the heat exchanger 24, as described further below. For example, in various embodiments the shield leg engagement structures 114 can have a T-shaped cross-sectional shape, while in other embodiments, it is envisioned that the shield leg engagement structures 114 can have a round, a diamond, a triangular, an oval, a hexagonal, or any other cross-sectional shape.

As also described above, in various embodiments, the heat exchanger 24 comprises the main body 112 and the plurality of shield retention guides 110 protruding from the main body 112, wherein each shield retention guide has a second engagement structure 118 (e.g., a retention finger) formed at a distal end thereof. The shield retention guides 110 and second engagement structures 118 are structured and operable to slidingly engage and retain the shield leg first engagement structures 114, and thereby retain the heat exchanger shield(s) 106. The shield retention guides 110 and the second engagement structures 118 define a shield retention channel 126 dispose between opposing adjacent shield retention guides and second engagement structures 110 and 118. For example, in various embodiments, the second engagement structures 118 comprise retention fingers that extend from the distal ends of the shield retention guides 110 at an angle inward toward an adjacent shield retention guide 110 such that the shield retention channel 126 is defined between one shield retention guide and finger 110 and 118, and an adjacent shield retention guide and finger 110 and 118. Each shield retention channel 126 can extend the entire length of the heat exchanger 24. The heat exchanger 24 can comprise any number of shield retention guides 110 and shield retention channels 24 across a width W (shown in FIG. 15) of the heat exchanger 24. Additionally, the retention guides 110 and shield retention channels 24 can be located anywhere along the width W of the heat exchanger 24 such that the heat exchanger shield(s) is/are located an any desired location across the width W of the heat exchanger, and/or in alignment with any desired portion of the drive track 22. For example, in various embodiments retention guides 110 and shield retention channels 24 are located on the heat exchanger 24 such that heat exchanger shield(s) 106, when installed on the heat exchanger 24, will align with and/or be adjacent to areas such as track windows or break spaces in track paddles disposed laterally across the width of the drive track 22.

Figure 18:
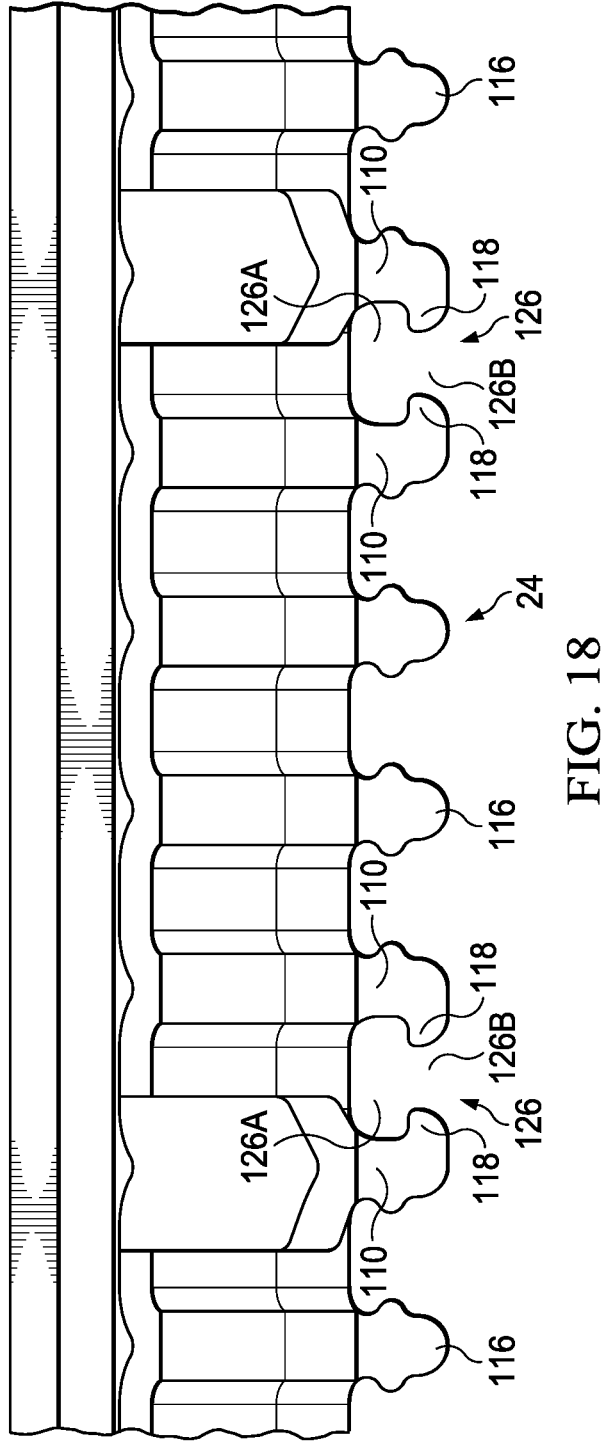
FIG. 18 is an exemplary close-up rear view of a portion of the heat exchanger illustrating heat exchanger heat shield retention channels formed in the heat exchanger for retaining the heat exchanger shields, in accordance with various embodiments of the present disclosure.

As best illustrated in FIG. 18, in various embodiments, each retention channel 126 can comprise a head portion 126A and neck portion 126B, wherein a width of the head 126A is greater than a width of the neck 126B. The retention channel head portions 126A can have any desired cross-sectional shape suitable to slidingly engage and retain the heat shield leg engagement structures 114. For example, in various embodiments the retention channel head portions 126A can have a T-shaped cross-sectional shape, while in other embodiments, it is envisioned that the shield leg first engagement structures 114 can have a round, a diamond, a triangular, an oval, a hexagonal, or any other cross-sectional shape. Importantly, the retention channel head portions 126A have a cross-sectional shape that is sized and shaped to slidingly accommodate and/or mate with the shield leg engagement structures 114.

Figure 19:
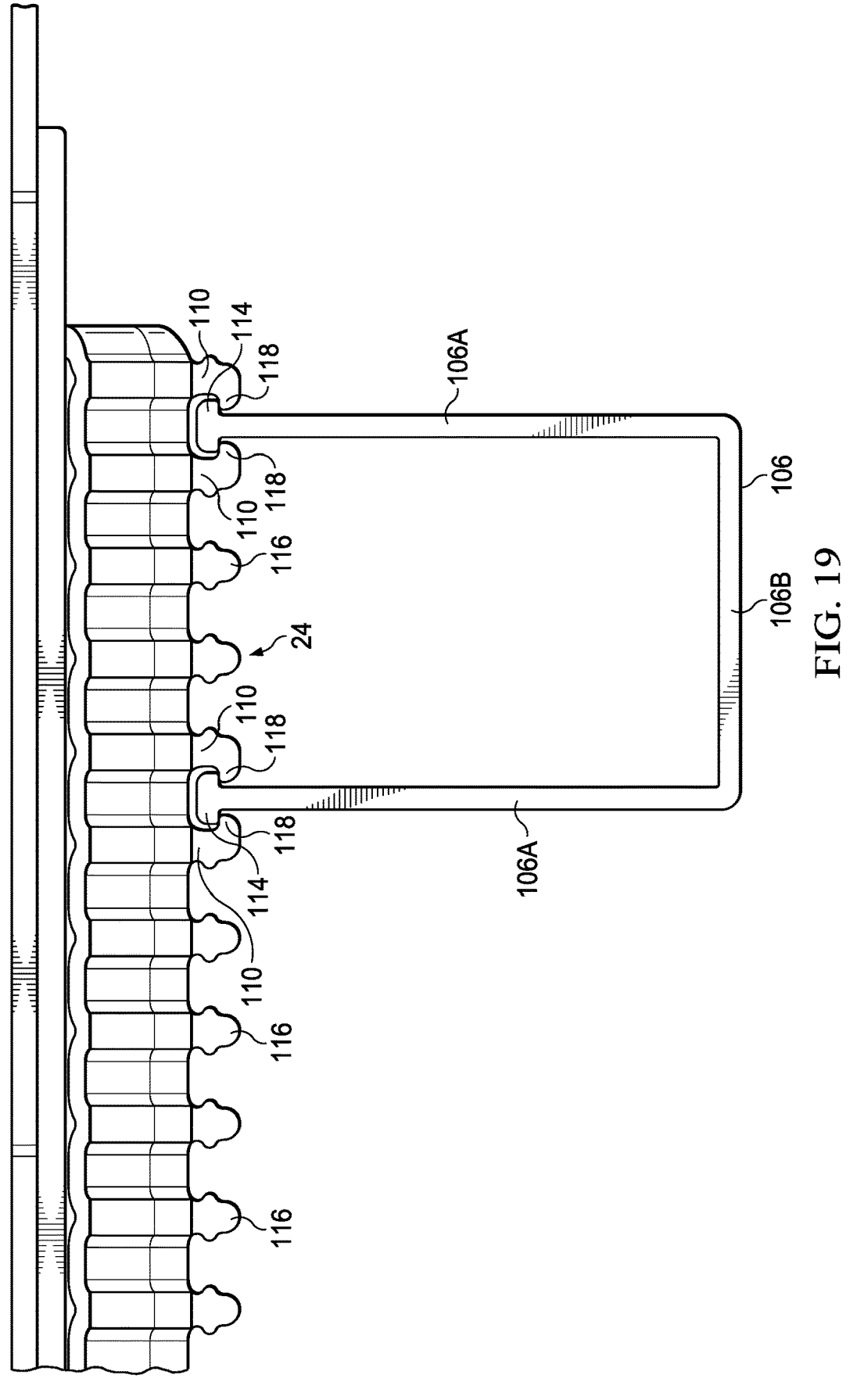
FIG. 19 is an exemplary close-up rear view of a portion of the heat exchanger illustrating a heat exchanger shield disposed in heat exchanger heat shield retention channels, in accordance with various embodiments of the present disclosure.
Figures 20, 21:
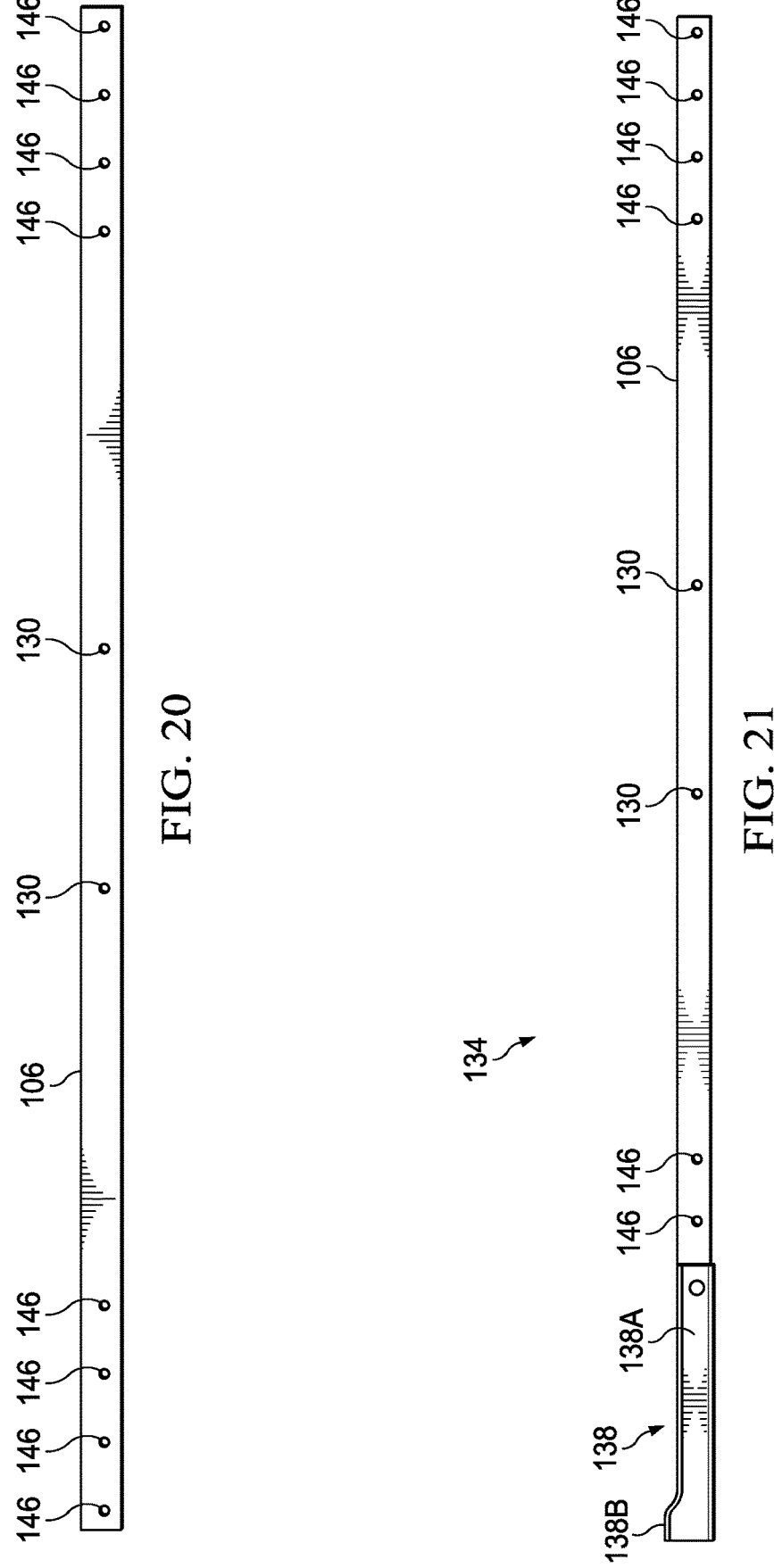
FIG. 20 is an exemplary side view of a heat exchanger shield, in accordance with various embodiments of the present disclosure.
FIG. 21 is an exemplary side view of a heat exchanger shield assembly, in accordance with various embodiments of the present disclosure.
Figure 22:
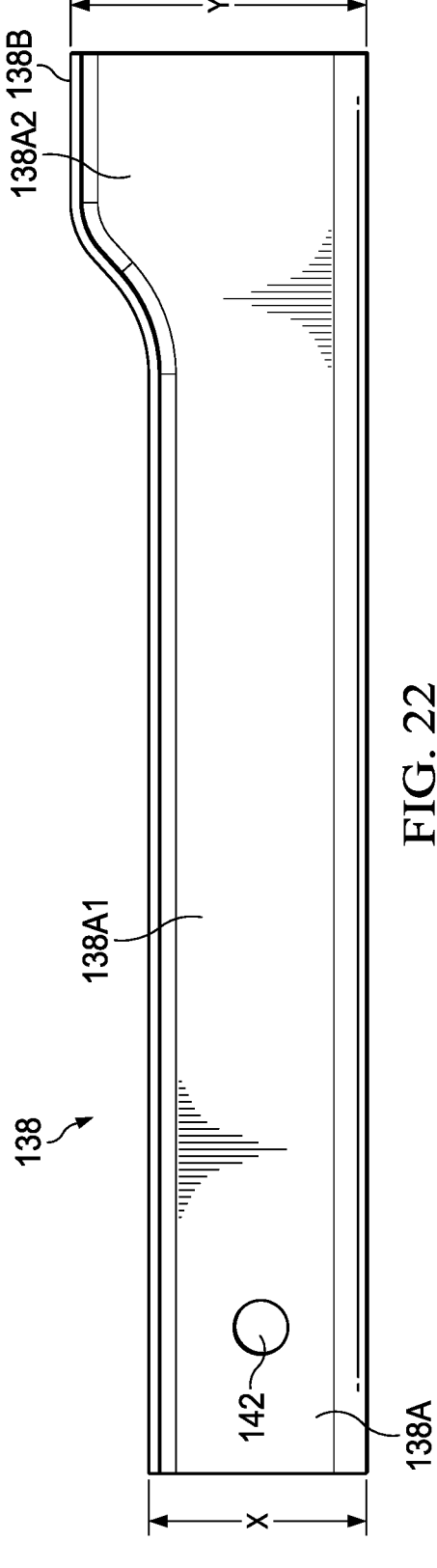
FIG. 22 is an exemplary side view of a heat exchanger shield mounting bracket of the heat exchanger shield assembly shown in FIG. 21, in accordance with various embodiments of the present disclosure.
Figure 23:
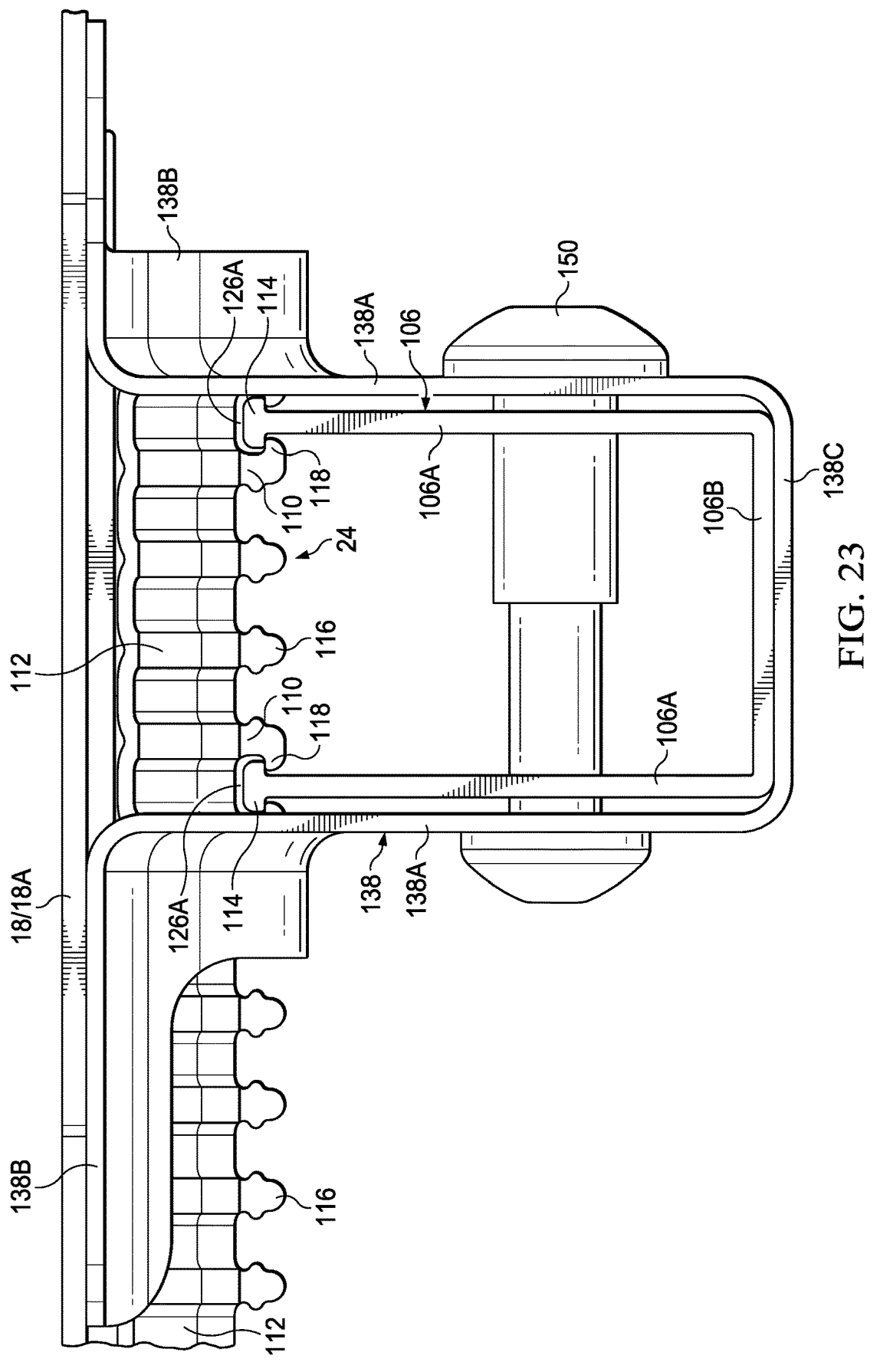
FIG. 23 is an exemplary rear view of the heat exchanger shield assembly shown in FIG. 21, in accordance with various embodiments of the present disclosure.

As best illustrated in FIG. 19, in various embodiments, the first engagement structure 114 formed at the distal end of each shield leg 106A can have a width that is greater than a width of the respective shield leg 106A and is sized and shaped to slidingly fit within the retention channel head 126A. Hence, to install a heat exchanger shield 106 onto the heat exchanger 24, the first engagement structures 114 of the heat exchanger shield legs 106A are inserted into the open end of the heads 126A of respective shield retention channels 126 at the rearward end of the heat exchanger 24 and the heat exchanger shield 106 is then slid within the shield retention channels 126 along the length of the heat exchanger 24 until the heat exchanger shield 106 is positioned at a desired location along the length of the heat exchanger 24. When installed as described herein, the heat exchanger shield(s) 106 provide a barrier between the heat exchanger 24 and the drive track 22 that prevent the drive track 22 (e.g., the paddles and/or studs/spikes) from striking or contacting and damaging the heat exchanger 24.

The heat exchanger shield(s) 106 can be constructed or fabricated of any durable material that can withstand the impact of the drive track 22 contacting the heat exchanger shield(s) 106 without bending, denting, cracking, breaking or otherwise degrading the heat exchanger shield(s) 106. For example, the heat exchanger shield(s) 106 can be constructed or fabricated of aluminum, sheet metal, a fiber reinforced polymer, additive manufacturing, or any other suitable metal, polymer or plastic composite or compound. In various embodiments, the heat exchanger shield(s) 106 can be constructed or fabricated of aluminum (e.g., extruded aluminum), or other thermally conductive material, such that the heat exchanger shield(s) 106 function as part of the heat exchanger 24 to thermally exchange heat with the environment surrounding the heat exchanger 24 and heat exchanger shield(s) 106 (e.g., air and/or snow and/or water), thereby assisting in the cooling of the cooling fluid circulating through the heat exchanger 24.

It should be understood that although the first engagement structures 114 form on the distal ends of the heat shield legs 106A have been exemplarily describes as being nodules or feet, and the second engagement structures 114 formed on the distal ends of the heat exchanger retention guides 110 have been exemplarily described as being retention fingers, such that second engagement structures 118 are slidingly insertable into the shield retention channels 126 defined by the heat exchanger retention guides 110 and second engagement structures 118, the present disclosure is not limited to this exemplary embodiment. For example, it is envisioned that in various embodiments, the first engagement structures 114 can be C-shaped claws formed on the distal ends of the heat shield legs 106A such that the retention channels 126 are defined as the interior space of the C-shaped claws, and the second engagement structures can be nodules or feet formed distal ends of the heat exchanger retention guides 110, whereby the second engagement structures 118 (e.g., the nodules or feet) can be slidingly inserted into the retention channels 126 defined by the first engagement structures 114 to mount the heat exchanger shield(s) 106 to the heat exchanger 24. Or, for example, it is envisioned that in various embodiments, the first engagement structures 114 can be fingers formed on the distal ends of the heat shield legs 106A that extend either inward or outward, and the second engagement structures can be fingers that extend either inward or outward (but are opposed to the direction of the figures defining the first engagement structures 114) formed distal ends of the heat exchanger retention guides 110, whereby the first engagement structures 114 can be slidingly engaged with the second engagement structures 118 to mount the heat exchanger shield(s) 106 to the heat exchanger 24. Or, for example, the first and second engagement structures 114 and 118 can be conceivable slidingly mateable engagement structures such that the heat exchanger shield(s) 106 can be slidingly engaged with the shield retention guides 110 to mount the heat exchanger shield(s) 106 to the heat exchanger 24 and remain within the scope of the present disclosure.

Referring now to FIGS. 14 through 21, once the heat exchanger shield(s) 106 are installed on the heat exchanger 24 as described above, the heat exchanger shield(s) 106 can be retained in place using any suitable fastening device, system, apparatus or process. For example, in various embodiments, the heat exchanger shield(s) 106 can have one or more set of opposing pinch holes 130 (see FIG. 16) disposed through the opposing shield legs 106A. A pinch fastener (not shown), e.g., a nut and bolt, can be inserted through the opposing pinch holes 130 and tightened to squeeze the opposing heat shield legs 106A together such that the heat shield legs 106A are pulled together, thereby pinching and binding the heat shield legs 106A and engagement structures 114 within and against the shield retention channels 126 such that the respective heat exchanger shield is secured in place on the heat exchanger 24. Although the pinch holes 130 are exemplarily illustrated to be disposed in a middle section of the heat exchanger shields 106, the pinch holes 130 can be provided anywhere along the length of the respective heat exchanger shield 106 and used to retain the respective heat exchanger 106 on the heat exchanger 24 as described above.

Referring now to FIGS. 20 through 25, in various embodiments each heat exchanger shield 106 can be part of a heat exchanger shield assembly 134 that comprises the heat exchanger shield 106 and a mounting bracket 138 that is connectable to the heat exchanger shield 106. The heat exchanger shield mounting bracket(s) 138 is/are structured and operable to be mounted or connected to rearward end of the tunnel 18 and/or the taillight housing fixture 26 to thereby secure the respective heat exchanger shield 106 in place within the shield retention channels 126 and to the heat exchanger 24, as described further below. In various embodiments, the exchanger shield mounting bracket(s) 138 is/are connectable to the heat exchanger shield 106 such that it can provide additional length to the heat exchanger shield assembly 134. Additionally, in various embodiments the exchanger shield mounting bracket(s) 138 is/are connectable to the heat exchanger shield 106 such that it can be utilized as an adjustable extension of the heat exchanger shield, whereby the length of the heat exchanger shield assembly 134 can be adjustable such that the heat exchanger shield assembly 134 can be installed on and utilized with various different heat exchangers 24 that have various different lengths. Although described herein as separate components forming the heat exchanger shield assembly 134, the shield 106 and the mounting bracket 138 may be integrally formed as a single piece.

In various embodiments, each heat exchanger shield mounting bracket(s) 138 can be an elongated U-shaped-like channel structure that is structured and operable to fit over an exterior surface of the heat exchanger shield 106. Each heat exchanger shield mounting bracket 138 generally comprises a pair of opposing legs 138A having a mounting flange 138B extending inward or outward from at least a portion of distal ends thereof. As exemplarily shown in FIG. 22, each leg 138A comprises a main body portion 138A1 having a first height X and a tail portion 138A2 having a second height Y, wherein the second height Y is greater than the first height X. In various embodiments the mounting flange 138B is formed at least at the distal end of the tail portion 138A2 of the legs 138A. One or both of the shield 106 and the mounting bracket 138 can include a feature for selectively adjusting the length of the shield assembly 134. In an illustrative example, each heat exchanger shield mounting bracket 138 additionally comprises at least one pair of shield connecting holes 142 formed in and disposed along the length of the legs 138A. For example, in various instances, the heat exchanger shield mounting bracket(s) 138 comprise(s) a pair of shield connecting holes 142 formed in proximal end portion of the legs 138A that is opposite the tail portion 138A2, while in other embodiments the heat exchanger shield mounting bracket(s) 138 comprise(s) multiple pairs of shield connecting holes 142 disposed at various locations along the length of the legs 138A The shield connecting holes 142 are structured and operable to join or connect the heat exchanger shield mounting bracket 138 to the respective heat exchanger shield 106.

Furthermore, each heat exchanger shield 106 comprises one or more pair of opposing bracket connecting holes 146 formed in and disposed in the opposing exchanger shield legs 106A at one or more location along the length of the respective heat exchanger shield 106. It is to be understood, however, that the shield assembly 134 is not limited to the use of holes as the feature for selectively adjusting the length of the shield assembly 134, and that other features can be used. Such a configuration allows the overall length of the heat exchanger shield assembly 134 to be adjustable, thereby allowing a common heat exchanger shield assembly 134 to be used on different snowmobile models having different tunnel 18 and/or heat exchanger 24 lengths.

For example, in various embodiments, each heat exchanger shield 106 can comprise a pair of opposing bracket connecting holes 146 formed in the opposing legs 106A at a specific location at one end of the respective heat exchanger shield 106 (e.g., a predetermined distance from the respective end of the heat exchanger shield 106), such that the respective heat exchanger shield assembly 134 has a preselected or predetermined length. In other embodiments each heat exchanger shield 106 can comprise a pair of opposing bracket connecting holes 146 formed in the opposing legs 106A at each end of the respective heat exchanger shield 106 at the same or different distance(s) from the respective end of the heat exchanger shield 106, such that the respective heat exchanger shield assembly can have one or two preselected or predetermined lengths. In yet other embodiments each heat exchanger shield 106 can comprise a plurality pair of opposing bracket connecting holes 146 formed in the opposing legs 106B at a plurality of different distances from one or both ends of the respective heat exchanger shield 106, such that the respective heat exchanger shield assembly can have multiple preselected or predetermined lengths. Accordingly, a common heat exchanger shield assembly 134 may be used on different snowmobile models having different tunnel 18 and/or heat exchanger 24 lengths. The difference in lengths can be accommodated by securing the mounting bracket 138 to the hole 146 that provides the mounting bracket 138 with the length extending from the rearward end of the shield 106 necessary to secure to the heat exchanger shield assembly 134 to the snowmobile.

Each heat exchanger shield mounting bracket 138 can have any desired U-shaped-like cross-sectional shape. For example, in various instances the heat exchanger shield mounting bracket(s) 138 can have a cross-member 138C formed between and connecting the legs 138A such that the heat exchanger shield mounting bracket(s) 138 have/has a square or rectangular U-shaped-like cross-sectional shape. While in other instances the legs 138A can connect to each other or be an extension of each other such that the respective heat exchanger shield mounting bracket 138 has a triangular, oval or circular U-shaped-like cross-sectional shape. In various embodiments, the heat exchanger shield mounting bracket(s) 138 is/are constructed or fabricated to have a shape and size such that each heat exchanger shield mounting bracket 138 will fit snuggly over the respective heat exchanger shield 106. That is, the heat exchanger shield mounting bracket(s) 138 is/are constructed or fabricated such that an inner surface of each heat exchanger shield mounting bracket 138 has substantially the same shape, size and geometry as the outer surface of the respective end of the respective heat exchanger shield 106 such that there is substantial contact surface area, particularly and thermal contact and continuity between the heat exchanger shield mounting bracket 138 and the respective heat exchanger shield 106.

Moreover, in various embodiments the heat exchanger shield mounting bracket(s) 138 can be constructed or fabricated of any durable material that can withstand the impact of the drive track 22 contacting the heat exchanger shield mounting bracket(s) 138 without bending, denting, cracking, breaking or otherwise degrading the heat exchanger shield mounting bracket(s) 138. For example, each heat exchanger shield mounting bracket 138 can be constructed or fabricated of aluminum, sheet metal, a fiber reinforced polymer, additive manufacturing, or any other suitable metal, polymer or plastic composite or compound. In various embodiments, the heat exchanger shield mounting bracket(s) 138 can be constructed or fabricated of aluminum (e.g., extruded aluminum), or other thermally conductive material, such that the heat exchanger shield mounting bracket(s) 138 function as part of the heat exchanger 24 to thermally exchange heat with the environment surrounding the heat exchanger 24, heat exchanger shield(s) 106 and heat exchanger shield mounting bracket(s) 138 (e.g., air and/or snow and/or water), thereby assisting in the cooling of the cooling fluid circulating through the heat exchanger 24.

As described above, each mounting bracket leg 138A comprises a main body portion 138A1 having a first height X and a tail portion 138A2 having a second height Y, wherein the second height Y is greater than the first height X. In various embodiments, the difference between the first height X and the second height Y is the thickness of the heat exchanger 24. Hence, each mounting bracket 138 is structured such that, when installed as described below, a flange 158 extending from the main body portion 138A1 of the legs 138A will extend over the fins 116 of the heat exchanger 24. The flange 158 can be positioned substantially flush with the fins 116 of the heat exchanger 24, or a gap may be provided therebetween. The tail portion 138A2 of the legs 138A will extend beyond the end of the heat exchanger 24 and the mounting flanges 138 will fit substantially flush against the underside of the rearward end of the tunnel 18. It is to be understood however, that a washer can be positioned between the tail portion 138A2 and the tunnel 18. In various instances the flange 158 provides reinforcement for embodiments when the heat exchanger 24 may extend to the rearward end of the tunnel 18 such that a rearward portion of the mounting bracket 138 is not covering a portion of heat exchanger 24, whereby there is a gap between that flange 158 and the tunnel 18. In such instances, if the drive track 22 hits the bracket 138, the flange 158 will reinforce that region and prevents the bracket 138 from bending or buckling.

Although the mounting bracket 138 is shown as being positioned at the rearward end of the heat exchanger 24, it is to be understood that the mounting bracket 138 can be positioned farther forward in the tunnel 18. In such an illustrative example, the flanges 158 of the mounting bracket 138 can extend outward beyond the edges of the heat exchanger 24 (e.g., the heat exchanger main body longitudinal leg(s) 126A) and contact the tunnel directly, and be secured thereto with one or more fasteners. Such a configuration can be helpful if the heat exchanger 24 extends all the way to the end of the tunnel 18 without leaving sufficient space for connecting the mounting bracket 138 to the tunnel at the rearward end.

Figure 24:
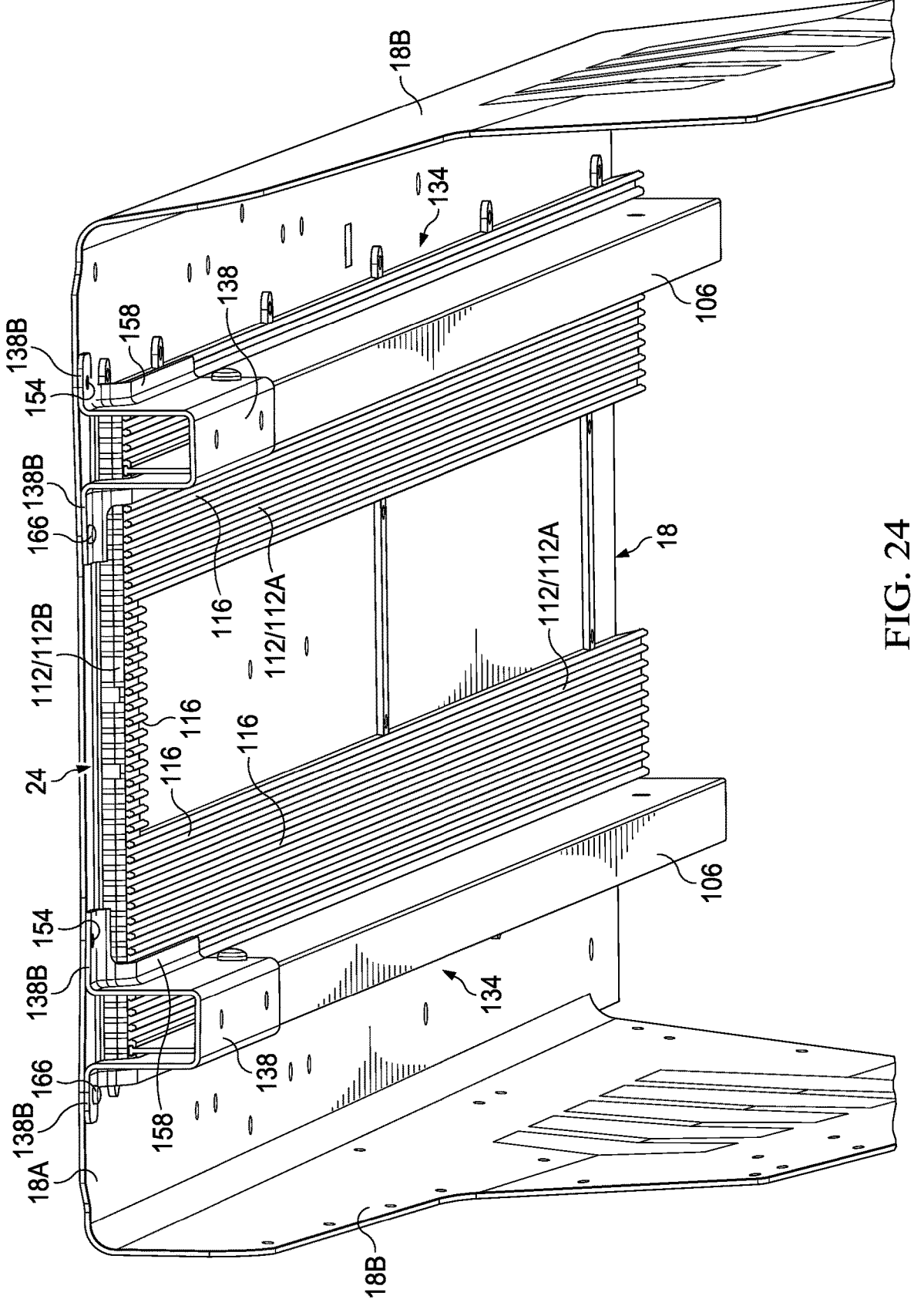
FIG. 24 is an exemplary isometric view of the heat exchanger having a pair of the heat exchanger shield assemblies shown in FIG. 21 installed thereon, in accordance with various embodiments of the present disclosure.
Figure 25:
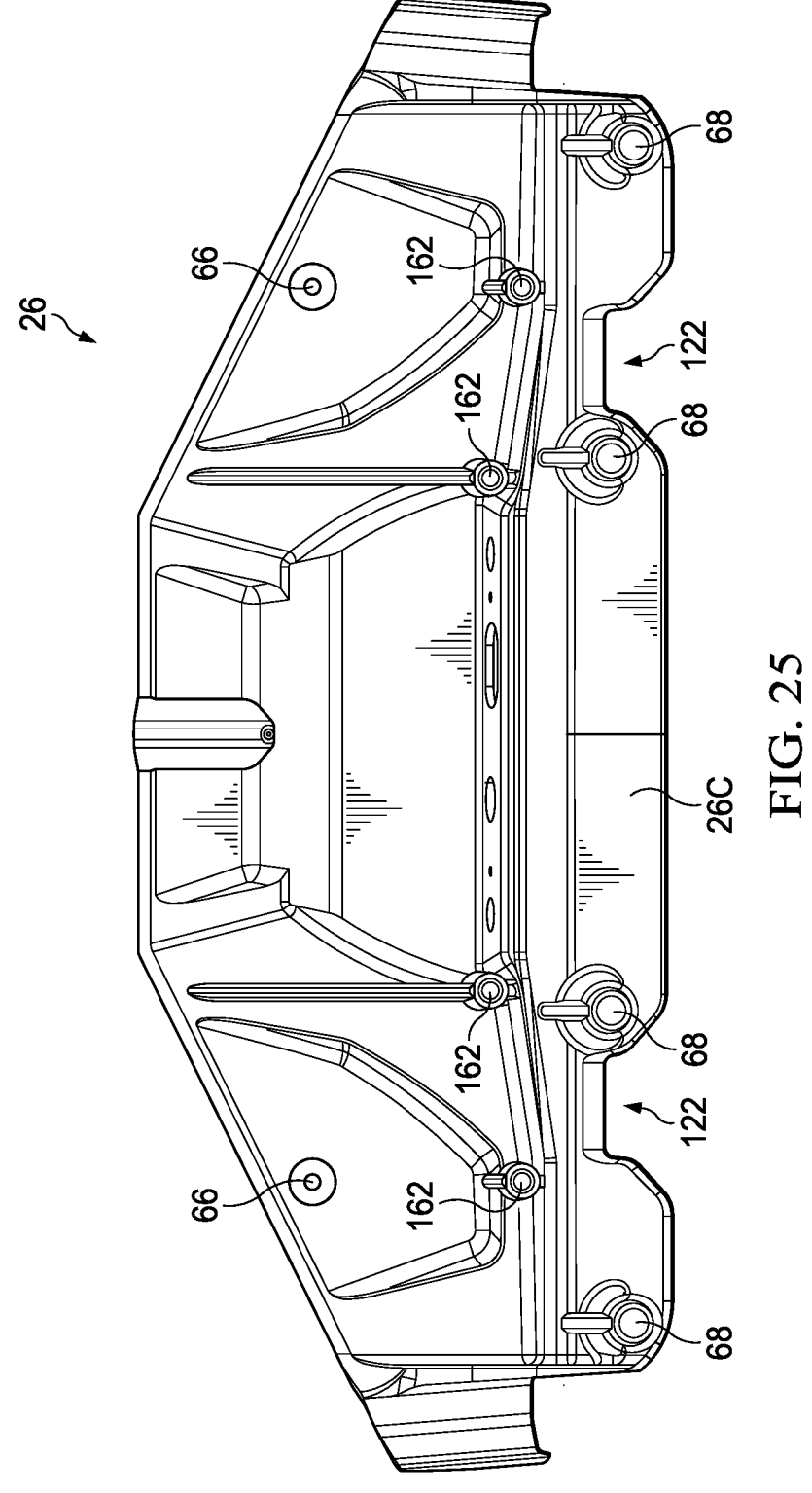
FIG. 25 is an exemplary illustration of an underside of the taillight housing fixture shown in FIGS. 3 through 7, in accordance with various embodiments of the present disclosure.

With particular reference to FIGS. 15, 24 and 25, in various embodiments an underside of the taillight housing fixture 26 can comprise a plurality of bracket mounting bosses 162 structured and operable to receive fasteners 166 (e.g., screws, bolts, rivets, etc.) that are utilized to secure the tail portion 138A2 of the heat exchanger shield mounting bracket to tunnel 18 and the taillight housing fixture 26. Particularly, the bracket mounting bosses 162 are located on the underside of the taillight housing fixture 26 such that they align with holes 164 that are disposed in the rearward distal end of the tunnel 18 to align with mounting apertures 154 disposed in the mounting flanges 138B of the shield mounting bracket 138. Accordingly, to secure the shield mounting bracket to the tunnel 18 and the taillight housing fixture 26, the fasteners 166 are inserted through the with mounting apertures 154 in shield mounting bracket mounting flanges 138B, and through the holes 164 disposed in the rearward distal end of the tunnel 18, and secured into (e.g., threaded into) the bracket mounting bosses 162 formed on the underside of the taillight housing fixture 26. In various embodiments, wherein there is no heat exchanger 24 or the heat exchanger 24 is secured to the underside of the tunnel 18 with the use of fasteners 166, the mounting bosses 162 and fasteners 166 can be used to secure the tunnel 18 to the taillight housing fixture 26.

In various embodiments, to install the heat exchanger shield assembly 134 on the heat exchanger 24, the snow flap is removed and the heat exchanger shield 106 is inserted through the shield access port or window 122 such that the first engagement structures 114 are inserted into an open end of the shield retention channels 126 at the rear of the heat exchanger 24 and the heat exchanger shield 106 is slidingly installed as described above. Thereafter, the respective heat exchanger shield mounting bracket 138 is disposed over the respective heat exchanger shield 24 (e.g., over the rearward end of the respective heat exchanger shield 24) such that the shield connecting holes 142 of the mounting bracket 138 align with the bracket connecting hole 146, or a selected one of the plurality of bracket connecting holes 146, of the heat exchanger shield 106, whereafter a fastener 150 (such as the two-part male/female fastener exemplarily shown in FIG. 23) is inserted therethrough and fastened to connect the heat exchanger shield mounting bracket 138 to the heat exchanger shield 106. The mounting bracket 138 is then connected to the rearward end portion of the tunnel 18 and the taillight housing fixture 26 via the tail portion 138A2 and flanges 138B. More particularly, each flange 138B comprises at least one mounting aperture 154 formed therein that is structured and operable to have a fastener 166 (e.g., screw, rivet, bolt, expanding push fastener, etc.) inserted therethrough to attach and secure the heat exchanger shield mounting bracket 138 to the rearward end portion of the tunnel 18 and the taillight housing fixture 26 via bracket bosses 158 as described above. In various embodiments, the mounting bracket 138 can be connected to the respective heat exchanger shield 106 prior to slidingly installing the heat exchanger shield 106 into shield retention channels 126, whereafter the heat exchanger shield mounting bracket 138 can be connected to the rearward end portion of the tunnel 18 as described above.

In various embodiments, the mounting bracket 138 can be secured to the rearward end portion of the tunnel 18 utilizing the same fasteners that are used to secure the taillight housing fixture 26 to the tunnel 18. For example, as described above, in various embodiments, the taillight housing leading edge portion 26A includes one or more attachment orifice 66 that are structured and operable to have a fastener (e.g., screw, rivet, bolt, expanding push fastener, etc.) inserted therethrough to attach and secure the taillight housing fixture 26 to the rearward distal end portion of the tunnel 18. In various embodiments, these same fasteners (e.g., screws, rivets, bolts, expanding push fasteners, etc.) can be removed and then reinstalled to secure both the mounting brackets 138 (and hence the heat exchanger shield(s) 106) and the taillight housing fixture 26 to the rearward distal end portion of the tunnel 18. Additionally, in various embodiments, the mounting bracket apertures 154 can be offset from each other so as to match with and align with the attachment orifices 66 of the taillight housing fixture 26.

To remove the heat exchanger shield(s) 134 the snow flap 28 is disconnected and removed from the taillight housing fixture flap mounting tail 26C and the bumper/hand bar 48. Thereafter, the fasteners securing the mounting brackets 138 to the tunnel 18 (e.g., the same fasteners that secure the taillight housing fixture 26 to the tunnel 18) are removed. Subsequently, the heat exchanger shield assembly 134 can be withdrawn through the heat exchanger shield access ports 122 and slidingly removed from the heat exchanger 24. Alternatively, the mounting brackets 138 can be disconnected from the heat exchanger shield 106, whereafter the heat exchanger shields 106 can be withdrawn through the heat exchanger shield access ports 122 and slidingly removed from the heat exchanger 24.

It is envisioned that in various embodiments, the taillight housing fixture can be fabricated from a stout but flexible material such that to slidingly install and to withdraw and slidingly remove the heat shield assembly 134 (or the heat shield 106) the flap mounting tail 26C and/or the main body 26A of the taillight housing fixture 26 can be pulled upward and flexed sufficiently to allow the heat exchanger shield assemblies 134 or the heat exchanger shields 106 to be installed or removed from the heat exchanger 24. In such instances, the heat exchanger shield access ports 122 would not be needed, and the taillight housing fixture 26 can be absent the heat exchanger shield access ports 122.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A snowmobile heat exchanger shield, comprising:
an elongated body, including a pair of opposing legs and a cross-member formed between and connecting the legs; and
wherein each of the legs include a first engagement structure structured and operable to slidingly engage a corresponding second engagement structure formed in a snowmobile heat exchanger for the entire length of the elongated body and wherein the second engagement structure includes one or more retention guides.

2. The shield of claim 1, wherein the shield has one of a square or a rectangular U-shaped-like cross-sectional shape.

3. The shield of claim 2, wherein the legs can one of connect to each other or be an extension of each other such that the shield body has one of a triangular, oval or circular U-shaped-like cross-sectional shape.

4. The shield of claim 2, wherein the shield further comprises at least one pinch hole disposed through the legs, the pinch holes structured and operable to receive a pinch fastener operable to squeeze the legs together and bind one or more of the first engagement structures within the one or more retention guides.

5. The shield of claim 2 wherein the shield further comprises at least one pair of opposing bracket connecting holes formed in the opposing legs, the bracket connecting holes structured and operable to connect the shield to a heat exchanger shield mounting bracket.

6. The shield of claim 5 wherein the at least one pair of opposing bracket connecting holes formed in the opposing legs comprises a plurality of pairs of opposing bracket connecting holes such that a heat exchanger shield and mounting bracket assembly comprising the heat exchanger shield mounting bracket secured to the shield has a selectably variable length.

7. A taillight housing and heat exchanger shield assembly for a snowmobile, said assembly comprising:
a taillight housing, wherein the taillight housing comprises:
a main body that is connectable to a drive track tunnel of the snowmobile; and
a pair of opposing retention wings extending from opposing lateral ends of the main body that are structured and operable to mount to a bumper/hand bar of the snowmobile, and one or more shield access ports; and
one or more heat exchanger shields, wherein each heat exchanger shield comprises:
an elongated body including opposing legs, wherein each of the opposing legs include a first engagement structure structured and operable to slidingly engage a corresponding second engagement structure formed in a heat exchanger of the snowmobile for the entire length of the elongated body;
wherein the one or more shield access ports allows for access to the one or more heat exchanger shields without removal or disassembly of the taillight housing.

8. The assembly of claim 7, wherein the elongated shield body further comprises a pair of opposing legs and a cross-member formed between and connecting the legs such that the shield has one of a square or a rectangular U-shaped-like cross-sectional shape.

9. The assembly of claim 8, wherein the legs can one of connect to each other or be an extension of each other such that the shield body has one of a triangular, oval or circular U-shaped-like cross-sectional shape.

10. The assembly of claim 8, wherein the shield further comprises at least one pinch hole disposed through the legs, the pinch holes structured and operable to receive a pinch fastener operable to squeeze the legs together and bind the first engagement structures within the second engagement structures.

11. The assembly of claim 7 wherein the shield further comprises at least one pair of opposing bracket connecting holes formed in opposing legs, the bracket connecting holes structured and operable to connect the shield to a heat exchanger shield mounting bracket.

12. The assembly of claim 11 wherein the at least one pair of opposing bracket connecting holes formed in the opposing legs comprises a plurality of pairs of opposing bracket connecting holes such that a heat exchanger shield and mounting bracket assembly comprising the heat exchanger shield mounting bracket secured to the shield has a selectably variable length.

13. The assembly of claim 7, wherein the retention wings are structured to be contoured and shaped to mate with a shape and contour of an outer surface of the bumper/hand bar.

14. The assembly of claim 13, wherein the taillight housing main body comprises a rear lens face for mounting at least one of one or more lighting fixture and one or more reflective lens, and the taillight housing fixture further comprises a flap mounting tail extending from the rear lens face, the flap mounting tail structured and operable to have a snow flap mounted thereto.

15. The assembly of claim 14, wherein the flap mounting tail comprises at least one heat exchanger shield access port structured and operable to provide access to the heat exchanger for installing and removing the heat exchanger shield.

16. The assembly of claim 14, wherein the one or more shield access ports are concealed when the snow flap is mounted thereto.

17. A method for assembling a heat exchanger shield assembly on a snowmobile heat exchanger, said method comprising:

providing access to a rearward end of heat exchanger disposed on an underside of a drive track tunnel of a snowmobile, the heat exchanger comprising a plurality of retention channels formed in a face of the heat exchanger;

slidingly engaging leg engagement structures of opposing legs within a pair of the retention channels, wherein the leg engagement structures are disposed at distal ends of each of the opposing legs;

sliding the leg engagement structures within the retention channels along a length of the heat exchanger until an entire length of the leg engagement structures are engaged with and disposed within the retention channels;

securing a heat exchanger shield mounting bracket to a distal end of the heat exchanger shield; and securing the heat exchanger shield mounting bracket to the drive track tunnel.

18. The method of claim 17, wherein providing access to the rearward end of the heat exchanger comprises providing at least one heat exchanger shield access port in a flap mounting tail of a taillight housing fixture mounted to a top side of the drive track tunnel.

19. The method of claim 18, wherein providing access to the rearward end of the heat exchanger further comprising removing a snow flap removably connected to the taillight housing flap mounting tail to expose the at least one heat exchanger shield access port.

20. The method of claim 17, wherein securing the heat exchanger shield mounting bracket to a distal end of the heat exchanger shield comprises:

aligning a pair of opposing shield connecting holes disposed in the heat exchanger shield mounting bracket with a selected pair of a plurality of opposing pairs of bracket connecting holes disposed at a plurality of location along the distal end heat exchanger shield; and inserting a fastener through the aligned pair of shield connecting holes and bracket connecting holes to secure the heat exchanger shield mounting bracket and thereby providing a heat exchanger shield and mounting bracket assembly having a selected length based on the selected pair of the plurality of opposing pairs of bracket connecting holes.

\* \* \* \* \*